United States Patent
Rexford et al.

(10) Patent No.: US 6,633,544 B1
(45) Date of Patent: Oct. 14, 2003

(54) EFFICIENT PRECOMPUTATION OF QUALITY-OF-SERVICE ROUTES

(75) Inventors: Jennifer Lynn Rexford, Summit, NJ (US); Anees Shaikh, Yorktown Heights, NY (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/339,361

(22) Filed: Jun. 24, 1999

Related U.S. Application Data

(60) Provisional application No. 60/090,490, filed on Jun. 24, 1998.

(51) Int. Cl.[7] .............................................. H04L 12/28
(52) U.S. Cl. ........................ 370/238; 370/255; 370/351; 370/395.5
(58) Field of Search ................................ 370/218, 238, 370/238.1, 254, 255, 256, 299, 351, 352, 353, 354, 355, 356, 357, 360, 367, 382, 389, 392, 397, 395.31, 395.52, 400, 408, 902, 912; 709/238–242; 455/445; 379/220.01, 221.02, 272, 273

(56) References Cited

U.S. PATENT DOCUMENTS

| | | | | |
|---|---|---|---|---|
| 5,321,815 A | * | 6/1994 | Bartolanzo et al. | 709/241 |
| 5,530,806 A | * | 6/1996 | Condon et al. | 714/49 |
| 5,561,790 A | * | 10/1996 | Fusaro | 370/395.43 |
| 5,881,243 A | * | 3/1999 | Zaumen et al. | 370/238 |
| 5,933,425 A | * | 8/1999 | Iwata | 370/351 |
| 6,078,963 A | * | 6/2000 | Civanlar et al. | 701/201 |
| 6,098,107 A | * | 8/2000 | Narvaez-Guarnieri et al. | 370/351 |
| 6,192,043 B1 | * | 2/2001 | Rochberger | 703/26 |
| 6,256,309 B1 | * | 7/2001 | Daley et al. | 370/395.32 |

OTHER PUBLICATIONS

Peyravian et al., "Network path caching: Issues, algorithms and a simulation study," Computer Communications, vol. 20, pp. 605–614, 1997.

(List continued on next page.)

*Primary Examiner*—Seema S. Rao
*Assistant Examiner*—Frank Duong

(57) ABSTRACT

The present invention provides a method and system for computing and storing minimum-cost routes to all destination nodes in a network. According to one embodiment, the present invention is applied in the context of computing quality of service routes using a source-directed connection-oriented routing environment. The route computation scheme employs an extension to Dijkstra's algorithm coupled with discretized link costs to generate a shortest-path graph with one or more routes to each destination. The present invention provides a compact data structure for storing at least one minimum-cost route to each destination node in a network. In particular, the routes are stored using a directed acyclic graph representing at least one minimum-cost pre-computed route for each destination node in the network. Each destination node in the network is associated with one or more parent pointers pointing to an upstream node in network that lies along a minimum-cost route. Routes are retained in the data structure and not extracted until connection arrival.

Upon connection arrival, a route is extracted from the data structure by performing a depth-first search of the acyclic graph, which returns the first route in the common case. As part of the route extraction process, the feasibility of each link in the route is determined based upon a recent link-state. Links that are infeasible are excluded from the extracted route. In addition, according to one embodiment, promising routes are re-ranked in the data structure to provide computational benefits for future route extractions.

16 Claims, 17 Drawing Sheets

OTHER PUBLICATIONS

Iwata et al., "PNNI routing algorithms for multimediaATM internet," NEC Research and Development, vol. 38, pp. 60–73, 1977.

Apostolopoulos et al., "On the effectiveness of path pre-computation in reducing the processing cost of on-demand QoS path computation," Proceedings of IEEE Symposium on Computers and Communications, (Athens, Greece) pp. 42–46, Jun. 1998.

Ma et al, "On path selection for traffic with bandwidth guarantees," in Proceedings of IEEE International Conference on Network Protocols, (Atlanta, GA) pp. 191–202, Oct. 1977.

Guerin et al., "QoS routing mechanisms and OSPF extensions," in Proceedings of IEEE Globecom, (Phoenix, AZ) pp. 1903–1908, Nov. 1997.

Le Boudec et al., "A route pre-computation algorithm for integrated service networks," Journal of Network and Systems Management, vol. 3, No. 4, pp. 427–449, 1995.

* cited by examiner

| NODE ID | SHORTEST COST ESTIMATE |
|---|---|
| 1 | 712(1) |
| 2 | 712(2) |
| 3 | 712(3) |
| ... | ... |
| N-1 | 712(N-1) |
| N | 712(N) |

FIG. 7c

| NODE ID | NODE ID | | | | | |
| | 1 | 2 | 3 | ... | N-1 | N |
|---|---|---|---|---|---|---|
| 1 | 720(1,1) | 720(1,2) | 720(1,3) | | | |
| 2 | 720(2,1) | 720(2,2) | 720(2,3) | | | |
| 3 | 720(3,1) | 720(3,2) | 720(3,3) | | | |
| ... | | | | . | | |
| N-1 | | | | | 720(N-1,N-1) | 720(N-1,N) |
| N | | | | | 720(N,N-1) | 720(N,N) |

FIG. 7d

| NODE ID | CANDIDATE NODE (PTR) |
|---|---|
| 1 | 710(1) |
| 2 | 710(2) |
| 3 | 710(3) |
| ... | ... |
| N-1 | 710(N-1) |
| N | 710(N) |

| NODE ID | HEAD NODE (HEAD) |
|---|---|
| 1 | 710(1) |
| 2 | 710(2) |
| 3 | 710(3) |
| ... | ... |
| N-1 | 710(N-1) |
| N | 710(N) |

| PARAMETER | MCI INTERNET | 5-ARY 3-CUBE |
|---|---|---|
| OFFERED LOAD | $\rho=0.65$ | $\rho=0.85$ |
| BANDWIDTH | $b=(0,4\%]$ | $b=(0,6\%]$ |
| ARRIVAL RATE | $\lambda=1$ | $\lambda=1$ |
| CONNECTION DURATION | $\varphi=46.8$ | $\varphi=46.8$ |

*FIG. 11*

EFFICIENT PRECOMPUTATION OF QUALITY-OF-SERVICE ROUTES

PRIOR PROVISIONAL PATENT APPLICATION

The present application claims the benefit under 35 U.S.C. § 119(e) of U.S. Provisional Application No. 60/090,490 filed Jun. 24, 1998.

FIELD OF THE INVENTION

The present invention relates generally to communication networks. In particular, the present invention is directed to a method and apparatus for computing, storing and allocating efficient routing connections between nodes in a network.

BACKGROUND INFORMATION

The performance and efficiency of packet switched networks is heavily dependent upon the routing algorithm implemented at the switches or routers in the network. In particular, the success of distributed audio and video applications hinges on predictable performance in the underlying communication network. A network can provide throughput and delay guarantees by reserving resources for individual connections or flows. The routing algorithm plays a pivotal role in this process by locating paths that can satisfy the performance requirements of arriving connections. This is particularly important for handling high-bandwidth multimedia streams, which often consume a relatively large fraction of the link capacity. Quality-of-service ("QoS") routing has the potential to optimize the usage of network resources and increase the likelihood of accepting new connections by selecting paths based on existing network load and connection traffic parameters. For example, there has been considerable effort and attention to the use of the Internet for the delivery of multimedia traffic. However, because multimedia traffic requires high bandwidth and low latency, the necessity for efficient methods to insure QoS are exacting.

Efficient QoS routing requires effective techniques for computing routes and exchanging link-state information. Link-state is typically propagated in a periodic fashion or in response to a significant change in available capacity. For example, a link may advertise its available bandwidth metric whenever it changes by more than 10% since the previous update message. In addition, a minimum time between update messages is often imposed to avoid excessive link-state update traffic.

QoS guarantees may be implemented by utilizing a connection-oriented environment as opposed to a pure packet switched network. In a connection-oriented environment, a route is determined for each connection or flow and resources are reserved across the route (for each link) for the duration of a connection. In contrast, in a purely packet switched network, the route traversed by individual packets may change during the duration of a connection and resources are not reserved. For example, the ATM Forum's PNNI ("Private Network Network Interface") standard defines a routing protocol for distributing topology and load information throughout the network, and a signaling protocol for processing the forwarding connection-establishment requests from the source. Similarly, proposed QoS extensions to the OSPF ("Open Shortest Path First Routing") protocol include an "explicit routing" mechanism for source-directed IP ("Internet Protocol") routing. MPLS ("MultiProtocol Label Switching") includes a similar technique for constraint-based routing.

A number of packet routing algorithms are known. Many networks such as the Internet employ a static routing scheme. In static routing, all links in a network or domain are associated with a cost metric set in advance by a network administrator. This link metric information is shared across the network domain such that each router is aware of the cost metric for every link in the network. Each router computes the lowest cost route to every other router in the network using a shortest-path algorithm such as Dijkstra's algorithm. Typically, the set of lowest-cost routes is stored in a routing table or cache at each router. When a packet arrives at a router, the router determines a next router to forward the packet to based upon the information in the static routing tables. Because in static routing all routers utilize identical information, all routers will calculate the same route for a packet. In the case of static link costs, propagation of link-state information between routers in a domain need only be effected infrequently, for example in the case of a link failure. Otherwise, the link state information, by definition, remains current.

However, static routing is inefficient because the load upon each link in a network or domain exhibits dynamic loading. Thus, the static costs associated with each link are inaccurate and the computation of the shortest cost route between a source and destination node, which rely upon these static cost metrics links, will not generate accurate results either. The inefficiency of static routing is most pronounced in a scenario where a highly sought resource suddenly becomes available on a network.

An attractive alternative to static routing is dynamic load-sensitive routing in which the cost metric for each link is continuously updated based upon the load measurement for the link. However, load-sensitive routing has an associated set of significant overheads. Namely, the distribution of link information itself increases the load on the network because each router is required to communicate the cost of each link to other routers as the link-state fluctuates. Second, link-state information may be dated or stale before it is used. This typically occurs because the time required to transmit link-state information is on the same order as the time required to send a packet (because both routing decisions and link-state is transmitted at the packet level). However, although load sensitive routing may prove inefficient at the packet level, in a connection oriented network, where connections are established for some length of time, load sensitive routing can improve efficiency.

A second issue regarding the implementation of routing policies concerns the distribution of the processing load required to compute routes through a network. In hop-by-hop routing, the routing work is shared among all nodes in a route, such that each node computes the next node in the route. However, in general, hop-by-hop routing is inefficient because it is desirable to know in advance, before a route is selected, that each link in the route can support the bandwidth required for a connection. Also, computing load-sensitive routes in a hop-by-hop fashion can lead to routing loops.

In source-directed routing, a source router or switch selects an entire route based upon connection throughput requirements and the available resources in the network (i.e., recent link state information). Each switch maintains its own view of the available link resources, distributes link-state information to other switches, and selects routes for new connections. To improve the scalability of these protocols in large configurations, the switches and links may be assigned to smaller peer groups or areas that exchange detailed link-state information. A network may be comprised of a multitude of peer groups or areas. Within a domain, each router has global knowledge of all links in its peer groups or areas and the associated cost metrics for these links. However, routers in a peer group or area typically only have limited knowledge about the link-state of the routers and links in external peer groups.

A goal of source-directed link-state routing is to minimize the probability that a chosen connection route will fail due to inadequate bandwidth. When a new connection is requested (i.e., the source is alerted to the bandwidth and destination for a connection), the source computes a route for the connection using the most recent link-state information. Based on the required bandwidth for the connection, the source node may eliminate some links because they cannot support the required bandwidth. For example, infeasible links may be pruned using the test (util(1)+b>1?), where util(1) is a utilization parameter associated with the current connection request and b is the bandwidth currently used on the link. Then, the source router runs a shortest path algorithm (e.g., Dijkstra's algorithm) in order to calculate the lowest cost path to the destination node. These costs are typically based on the load at each link. The shortest path is usually computed by analyzing the load on each link and hop count. It is undesirable to choose routes that require an excessive number of hops, even though the route may be minimally loaded. A routing failure occurs when the source cannot find a feasible path to the destination.

If a route is found by the source, the route is tested to insure that there is sufficient bandwidth along each link to accommodate the connection. Typically, the source attempts to establish a virtual circuit on the chosen route by sending a set-up message that travels hop-to-hop (hop-by-hop signaling) through the network on the selected route to the destination node. Each switch or router along the way passes the test connection to the next router or switch until the set-up message reaches the destination, at which time the connection is established if possible. If one or more links cannot support the bandwidth demanded for the traffic (i.e., a set-up failure occurs) the connection is not established and the source may decide to try a new route that excludes the offending link or may simply block the connection. This may happen, for example, if the link information is out of date and the link no longer has the available bandwidth to support the connection. If the connection is accepted, the source router initiates hop-by-hop signaling to cause each router along the route to reserve the requisite bandwidth for the connection.

Efficient source-directed link-state routing imposes counterbalancing demands. First, the link-state information must be as current as possible to prevent the situation in which a selected link cannot actually support the traffic. However, distributing link load information, signaling and computing routes for new connections can consume considerable bandwidth, memory and processing resources. In addition, the route computations and signaling attempts consume processing resources at the switches and introduce set-up latency for each accepted connection. Minimizing these overheads is particularly important during periods of transient overload such as bursty connection arrivals or rerouting of traffic after a link failure.

In addition, the computational bandwidth must be minimized. Distributing link load information and computing routes for new connections can consume considerable bandwidth, memory and processing resources. Controlling these overheads in large backbone networks requires a careful trade-off between accuracy and complexity.

Most previous research on QoS routing has investigated on-demand policies that compute a path at connection arrival. Recent work has considered precomputation or path-caching schemes that attempt to amortize the overheads of route computation by reusing the paths for multiple connection requests. Precomputing routes offers a number of benefits including the amortization of computation overhead over multiple flows, simplification of CPU provisioning with periodic recomputation and reduced set-up delay by avoiding on-demand computation.

However, path precomputation introduces a trade-off between processing overheads and the quality of the routing decisions. Previous work on precomputed routes has focused on quantifying this trade-off and developing guidelines for when to recompute routes, focusing on path caching policies, performance evaluation and algorithmic issues. In particular, known methods for precomputation of network routes involve storing routes in a separate data structure and considering different policies for updating and replacing precomputed routes. For example, M. Peyravian and A. D. Kshemkalyan, "Network path caching: Issues, algorithms and a simulation study," *Computer Communications*, vol. 20, pp. 605–614, 1997 describes a policy that invalidates cache entries based on the number of link-state updates that have arrived for links in the precomputed paths. The proposed algorithms in this reference also check the current link-state when selecting a path from the cache and allow recomputation when the cached paths are not suitable. However, the reference does not address route computation or path extraction mechanisms.

In A. Iwata, R. Izmailov, H. Suzuki and B. Sengupta, "PNNI routing algorithms for multimedia ATM internet," *NEC Research and Development*, vol. 38, 1997, a set of route precomputation policies are proposed that optimize various criteria such a connection blocking and set-up latency. The algorithms attempt to locate routes that satisfy several QoS requirements through an iterative search of precomputed paths (optimized for hop-count) followed, if necessary, by several on-demand calculations that optimize different additive QoS parameters.

Other research has focused on detailed performance evaluation to compare precomputed and on-demand routing under different network, traffic and staleness configurations. For example, G. Apostolopoulos and S. K. Tripathi, "On the effectiveness of path pre-computation in reducing the processing cost of on-demand QoS path computation," *Proceedings of IEEE Symposium on Computers and Communications*, (Athens, Greece), June 1998, evaluates the performance and processing overhead of a specific path precomputation algorithm. The study adopts a Bellman-Ford-based algorithm and evaluates a purely periodic precomputation scheme under a variety of traffic and network configurations. The study presents a detailed cost model of route computation to compare the overhead of on-demand and precomputed strategies. As part of a broader study of QoS routing, Q. Ma and P. Steenkiste, "On path selection for traffic with bandwidth guarantees," in *Proceedings of IEEE International Conference on Network Protocols*, (Atlanta, Ga.), October 1997, describes a class-based scheme that precomputes a set of routes for different bandwidth classes. The evaluation compares the performance of several algorithms for class-based path computation to on-demand computation. However, neither of these references proposes any particular strategy for path storage or extraction of routes but instead focus on performance trends.

Other studies consider different mechanisms to precompute paths for multiple destination nodes and connection QoS requirements. For example, R. Guerin, A. Orda, and D. Williams, "QoS routing mechanisms and OSPF extensions,"

in *Proceedings of IEEE GLOBECOM*, (Phoenix, Ariz.), Nov. 1997 proposes a Dijkstra-based algorithm that computes minimum-hop paths for different bandwidth classes. Another algorithm introduced in J.-Y. Le Boudec and T. Przygienda, "A route pre-computation algorithm for integrated service networks," *Journal of Network and Systems Management*, vol. 3, no. 4, pp. 427–449, 1995 precomputes a set of extremal routes to all destinations such that no other route has both higher bottleneck bandwidth and smaller hop-count. The Bellman-Ford-based algorithm in R. Guerin, A. Orda, and D. Williams, "QoS routing mechanisms and OSPF extensions," in *Proceedings of IEEE GLOBECOM*, (Phoenix, Ariz.), November 1997 uses a similar optimization criterion to construct a next-hop routing table with multiple routing entries for each destination.

However, none of these studies consider computation overheads or efficient mechanisms to store precomputed paths and apply the most recent link-state information.

A significant issue with source directed routing concerns the most efficient data structure to store the set of shortest path costs. Some network routes will be very short (e.g. two adjacent nodes). However, other routes spanning the entire network will be long. Thus, an efficient data structure for storing these routes becomes important. In the typical scenario, a data structure modeling the Dijkstra directed graph is used to compute the routes. The routes are then extracted and loaded into a table type of data structure. Upon computation of these routes, the Dijkstra data structure is deleted. In particular, source-directed routing requires the source to maintain a variable-length list of all links on the path to the destination. This list (or stack) becomes part of the signaling message that establishes a connection (e.g., a "designated transit list" in PNNI or an "explicit route advertisement" in the QoS extensions to OSPF).

Path precomputation schemes benefit from having multiple candidate routes to each destination to balance network load and have additional routing choices in the case of signaling failure. However, computing and extracting multiple routes further adds to the computational and storage complexity in known methods for network route computation. In addition, since link-state information changes over time, these cached routes must be invalidated and/or recomputed periodically. For example, a switch might precompute the k>1 shortest paths (in terms of hop-count or other cost) to each destination. Alternatively, a routing algorithm might compute all paths within some additive or multiplicative factor $\epsilon$ of the best path. However, these approaches introduce considerable computational complexity. For example, computing the k shortest paths for a single destination in a directed graph has complexity as high as $O(kN^3)$ (where k=a constant and N=the number of nodes in the network). In addition, the k shortest paths (or paths within $\infty$ of optimal) to one node may not be part of the best routes to other destinations and it is not usually possible to store these multiple routes in a compact, shortest-path graph representation.

Thus, there is a need for efficient methods for calculating and storing precomputed network paths that address the following questions:

How should precomputed routes be stored?

How should multiple routes be computed?

How much work should be performed at connection arrival?

How should routing and signaling overheads be limited?

BRIEF DESCRIPTION OF THE INVENTION

The present invention provides a method and system for computing and storing minimum-cost routes to all destination nodes in a network. According to one embodiment, the present invention is applied in the context of computing QoS routes using a source-directed connection-oriented routing environment. The route computation scheme employs an extension to Dijkstra's algorithm coupled with discretized link costs to generate a shortest-path graph with one or more routes to each destination. The present invention provides a compact data structure for storing at least one minimum-cost route to each destination node in a network. In particular, the routes are stored using a directed acyclic graph representing at least one minimum-cost pre-computed route for each destination node in the network. Each destination node in the network is associated with one or more parent pointers pointing to an upstream node in network that lies along a minimum-cost route. Routes are retained in the data structure and not extracted until connection arrival.

Upon connection arrival, a route is extracted from the data structure by performing a depth-first search of the acyclic graph, which returns the first route in the common case. As part of the route extraction process, the feasibility of each link in the route is determined based upon a recent link-state. Links that are infeasible are excluded from the extracted route. In addition, according to one embodiment, promising routes are re-ranked in the data structure to provide computational benefits for future route extractions.

BRIEF DESCRIPTION OF THE DRAWINGS

FIG. 7*c* depicts an exemplary data structure for associating a set of nodes with a shortest distance estimate parameter according to one embodiment of the present invention.

FIG. 7*d* depicts an exemplary data structure for associating a set of links between nodes with a set of link costs according to one embodiment of the present invention.

FIG. 7*e* depicts an exemplary data structure for associating a set of linked lists with a respective head pointer according to one embodiment of the present invention.

FIG. 7*f* depicts an exemplary data structure for associating a set of linked lists with a respective current candidate parent pointer according to one embodiment of the present invention.

FIG. 11 is a chart summarizing the simulation parameters for two network topologies tested according to one embodiment of the present invention.

DETAILED DESCRIPTION

Figure 1:
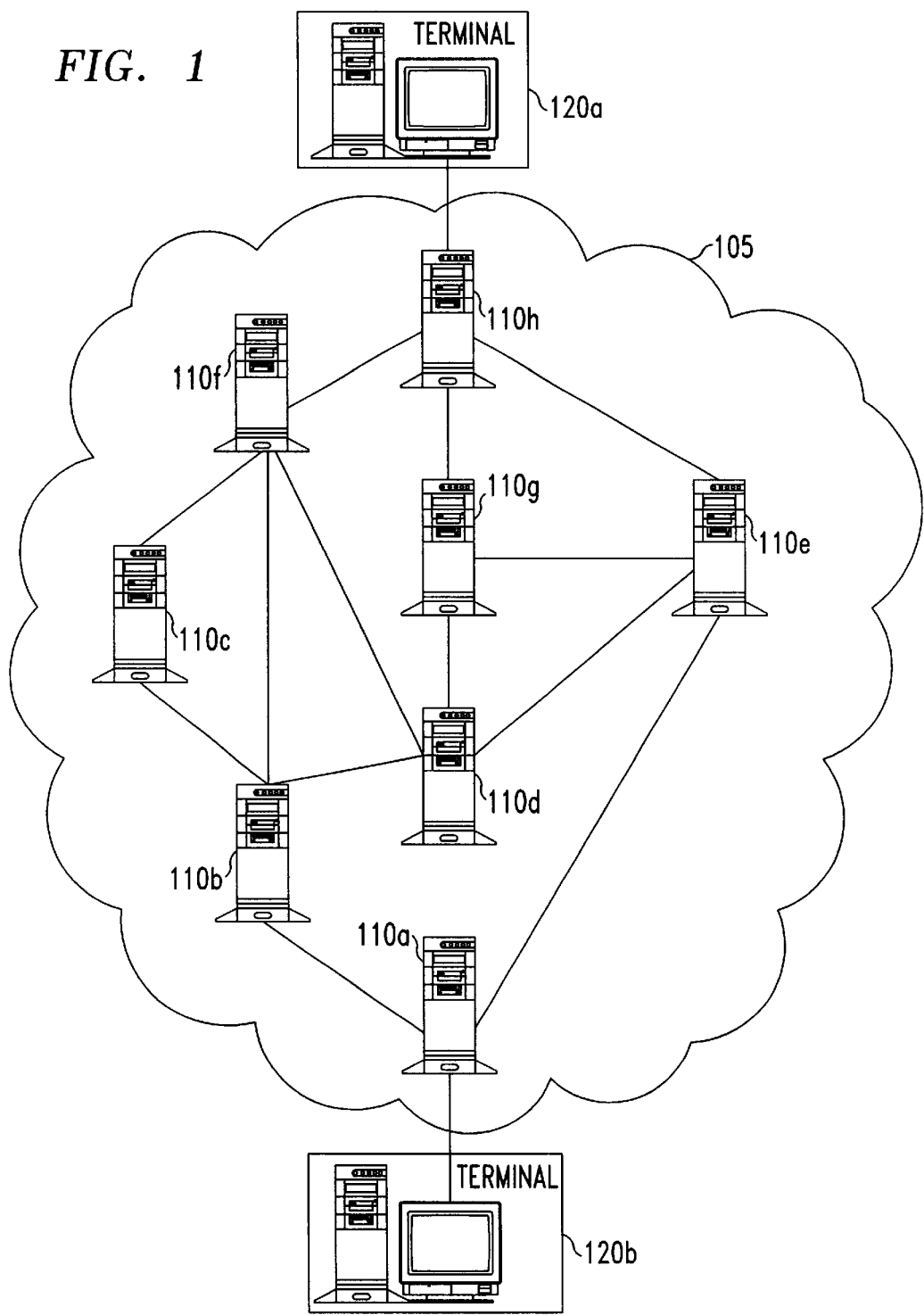
FIG. 1 depicts an exemplary network architecture according to one embodiment of the present invention.

FIG. 1 depicts an exemplary network architecture according to one embodiment of the present invention. FIG. 1 shows the present invention applied to QoS routing within a single peer group. However, in alternative embodiments, the present invention may be applied to the general case of hierarchical networks. Physical nodes $110a$–$110h$ are collected into a group known as peer group 105. According to one embodiment, for example, nodes $110a$–$110h$ represent ATM switches. However, in an alternative embodiment, nodes $110a$–$110h$ may be IP ("Internet Protocol") routers or some other apparatus for performing switching and routing of packet data. Nodes $110a$–$110h$ are organized within peer group 105 according to a network topology, which comprises a set of links between nodes $110a$–$110h$ (depicted by lines connecting various pairs of nodes $110a$–$110h$). Also shown in FIG. 1 are terminals $120a$ and $120b$ that represent the endpoints of a desired communication link. For example, terminals $120a$–$120b$ may represent two computer terminals for which it is desired to establish a high-bandwidth multimedia communication session. Or, according to another embodiment, terminal $120b$ may represent a server for streaming or multicasting multimedia content across peer group 105 for delivery to personal computer $120a$.

According to one embodiment of the present invention, each node $110a$–$110h$ maintains its own view of the available link resources within peer group 105, distributes link-state information to other switches, and selects routes for new connections. For example, link-state is typically propagated in a periodic fashion or in response to a significant change in available capacity. For example, a link may advertise its available bandwidth metric whenever it changes by more than 10% since the previous update message; in addition, a minimum time between update messages is often imposed to avoid excessive link-state update traffic.

Figure 2:
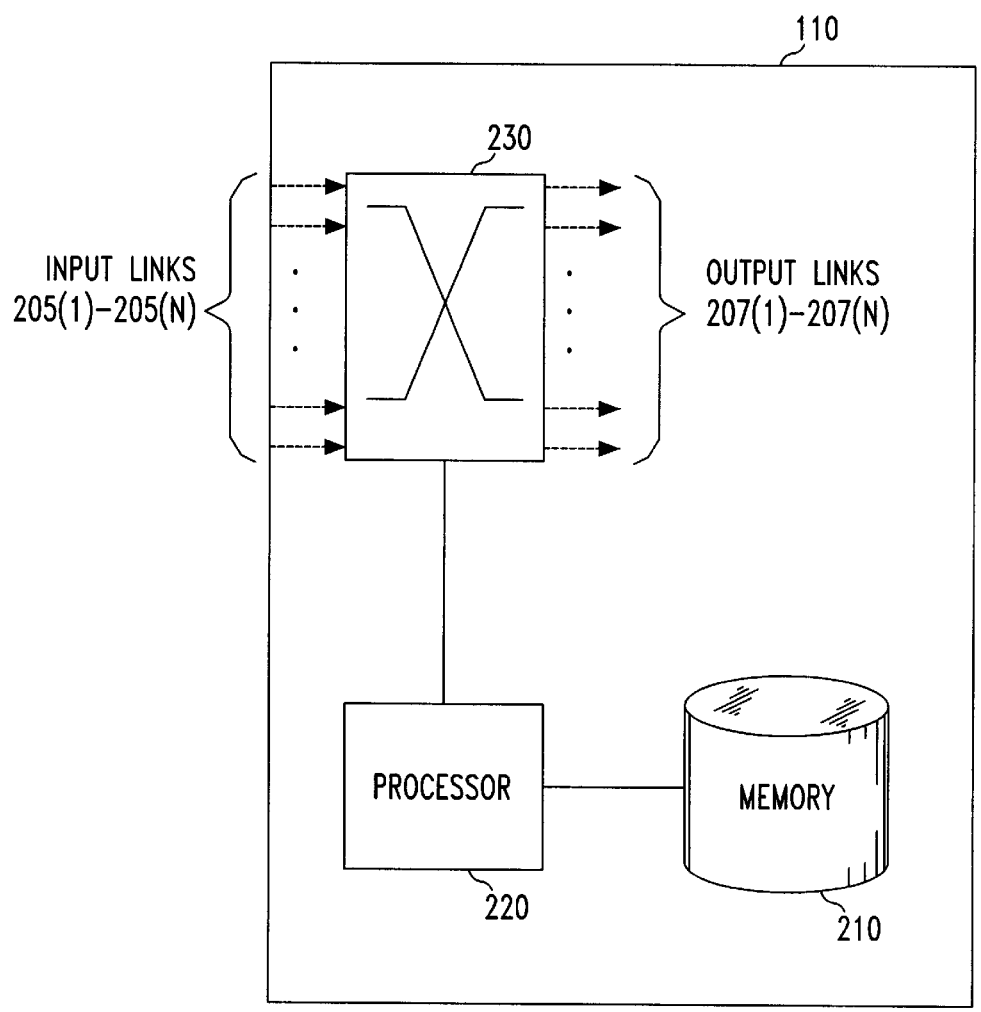
FIG. 2 is a block diagram depicting the architecture of a switch according to one embodiment of the present invention.

Each node contains hardware and software components for implementing packet routing and other functions. FIG. 2 is a block diagram depicting the architecture of a node according to one embodiment of the present invention. In particular, node 110 contains memory 210, processor 220 and switching fabric 230. Switching fabric contains a pre-determined number of input communication links 205(1)–205(N) and output communication links 207(1)–207(N) which are connected with transmitting nodes (not shown) and receiving nodes (not shown), respectively. Input links 205(1)–205(N) and output links 207(1)–207(N), while logically separate, are paired by switching fabric 230 such that one inbound and one outbound connection are joined to form a physical full-duplex link.

Cells are received by node 110 and are retransmitted on one of the output links 207(1)–207(N) according to the routing rules of the protocol implemented on switch 110 (e.g., ATM). The switching process involves receiving a cell on an input link and extracting the cell's header to determine on which outbound link it must be forwarded. For example, in an ATM environment the VPI ("Virtual Path Identifier")/VCI ("Virtual Circuit Identifier") fields are changed to new values appropriate to the outbound link. The cell is then retransmitted towards its destination on an outbound link.

In addition, node 110 must perform additional functions such as handling the serial link protocol for the attached communication links, performing a header error check for received cells, handling congestion, and implementing control mechanisms for updating VPI/VCI connection tables etc. In order to implement the control of switching fabric 230 and perform these other functions, processor 220 executes one or more processes for controlling node 110. Processor 220 interacts with memory 210 that stores program instructions or data. Memory 210 may be volatile memory such as RAM ("Random Access Memory"), non-volatile memory such as ROM ("Read Only Memory), a hard disk or a combination of these elements.

Figure 3A:
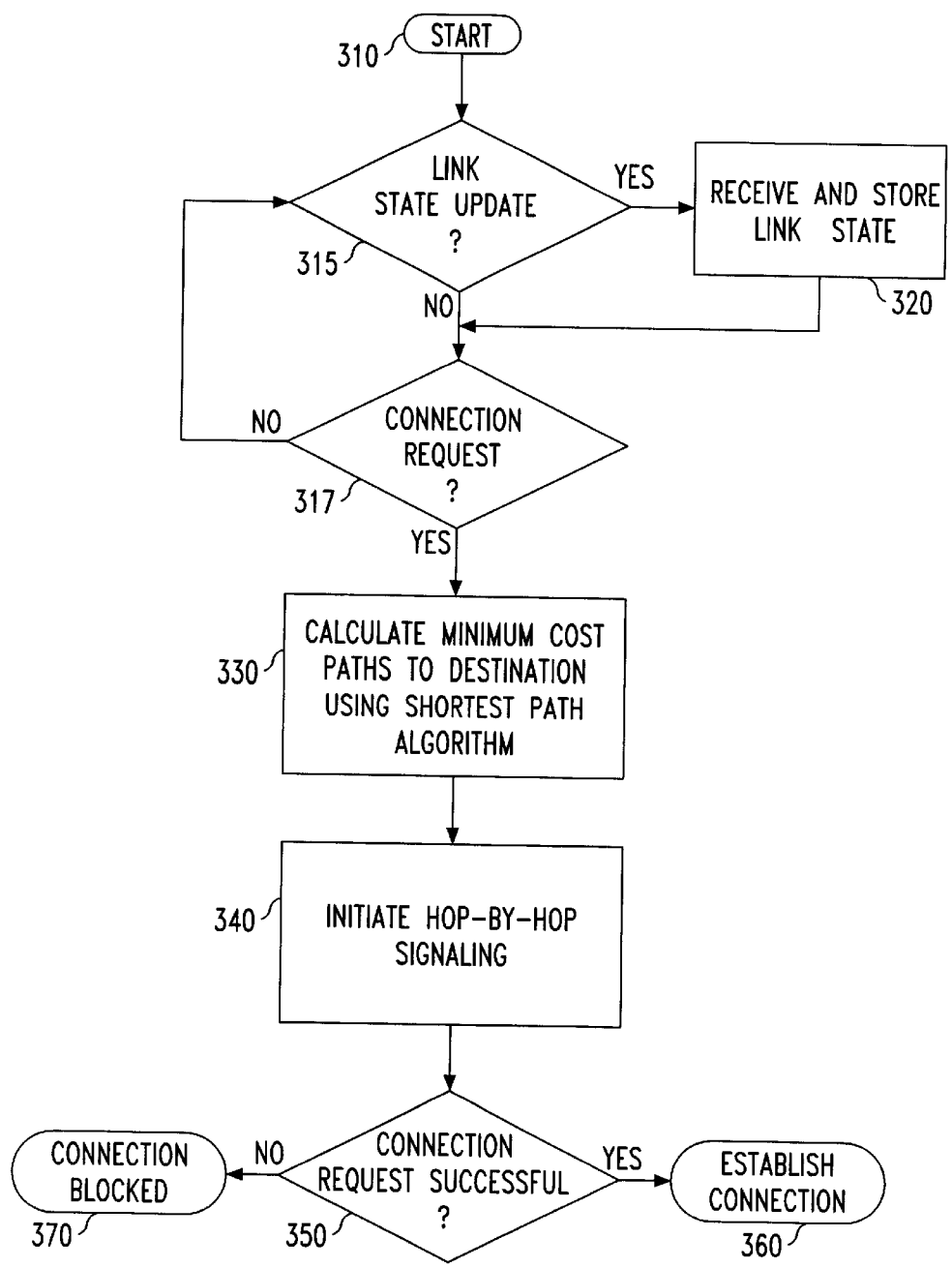
FIG. 3*a*, which is prior art, is a flowchart depicting a method for on-demand routing of packets.

FIG. 3a, which is prior art, is a flowchart depicting a method for on-demand routing of packets. The process is initiated in step 310. In step 315, it is determined whether there has been a link-state update. Typically, this will occur on either a periodic basis on upon a significant change in a particular link capacity. If link-state has been updated ('yes' branch of step 315) the new link-state information is received (step 320). In step 317, the process waits for a connection request. If no connection request is received (i.e., in a particular time period), the process checks for updated link-state information ('no' branch of step 317). Otherwise, if a connection request has been received ('yes' branch of step 317), in step 330, the minimum cost path to the destination for the route is calculated based on the most recent link-state information. After the minimum cost route is computed, hop-by-hop signaling is initiated in step 340 to determine whether all links along the route can support the connection. If the connection request is successful ('yes' branch of step 350), the connection is established (step 360). Otherwise ('no' branch of step 350), the connection is blocked 370.

Figure 3B:
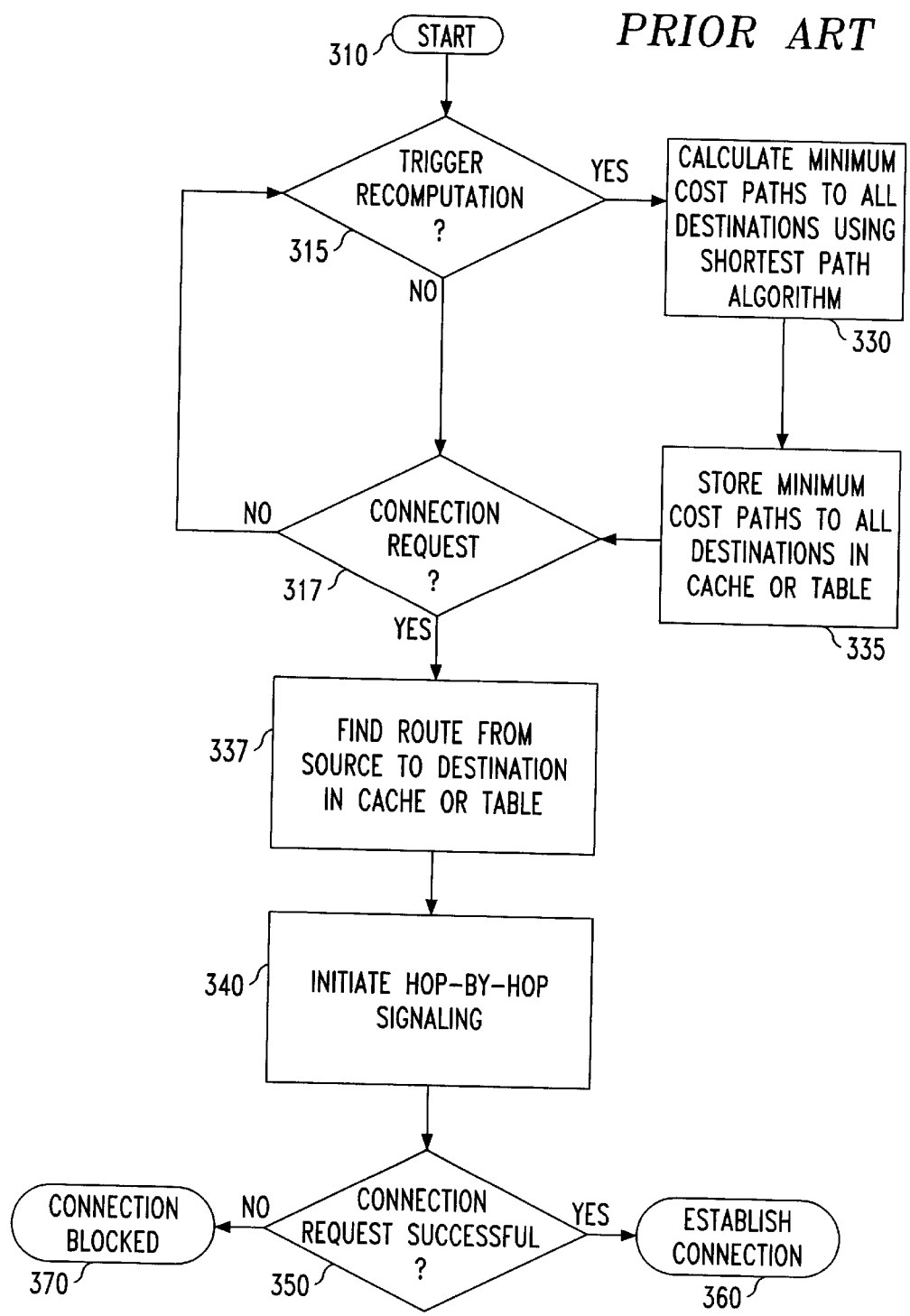
FIG. 3*b*, which is prior art, is a flowchart depicting a method for routing of packets using a precomputation scheme.

FIG. 3b, which is prior art, is a flowchart depicting a method for routing of packets using a precomputation scheme. In particular, the scheme depicted in FIG. 3b shows one known method using periodic triggered recomputations based on a time interval. The process is initiated instep 310. Instep 315, it is determined whether recomputation of the shortest-path algorithm should be run. Typically, this will occur on a periodic basis. If recomputation is triggered ('yes' branch of step 315), a process is executed to determine the minimum cost routes to all destinations in the network using a recent link-state(step 330). In step 335, the computed minimum cost paths are stored in a cache or table for future reference.

If a recomputation is not triggered ('no' branch of step 315) or after a recomputation, in step 317, a determination is made whether a connection request has been received. If not ('no' branch of step 317), the process checks again to see whether link-state has been updated (step 315). If a connection request has been received, a route to the destination is selected from the cache or table of minimum-cost routes (step 337). Then, in step 340 a connection request is forwarded from the source node to each node along the route. Each node, in turn, checks to determine whether sufficient bandwidth exists along its respective link to support the connection. If all links from the source to destination can support the connection (step 350), the connection is established ('yes' branch of step 350). If not, in step 370 the connection is blocked ('no' branch of step 350).

Reducing the overheads of route computation requires careful consideration about how much information and processing are involved on various time scales. The source switch receives the most accurate information about network load and connection resource requirements upon the arrival of new link-state updates and connection requests. The precomputation scheme according to the present invention does not perform any work upon receiving a link-state message beyond recording the new load information and only modest work upon connection arrival. Instead, most of the processing is relegated to background computation of a shortest-path graph of routes to each destination. By delaying route extraction until connection arrival the most recent link-state is exploited to find a suitable path while incurring only modest overhead. According to one embodiment recomputation is triggered occasionally, which further improves the ability to find a path and to select better routes for future connections.

According to the present invention, each node in a network that may act as a source node only need store a single data structure to represent all minimum cost routes to all destinations in the network. This compact data structure permits significant storage savings of route paths and provides an efficient mechanism for route extraction upon a connection request. In particular, extracting a route using this representation introduces complexity in proportion to the path length.

Figure 4:
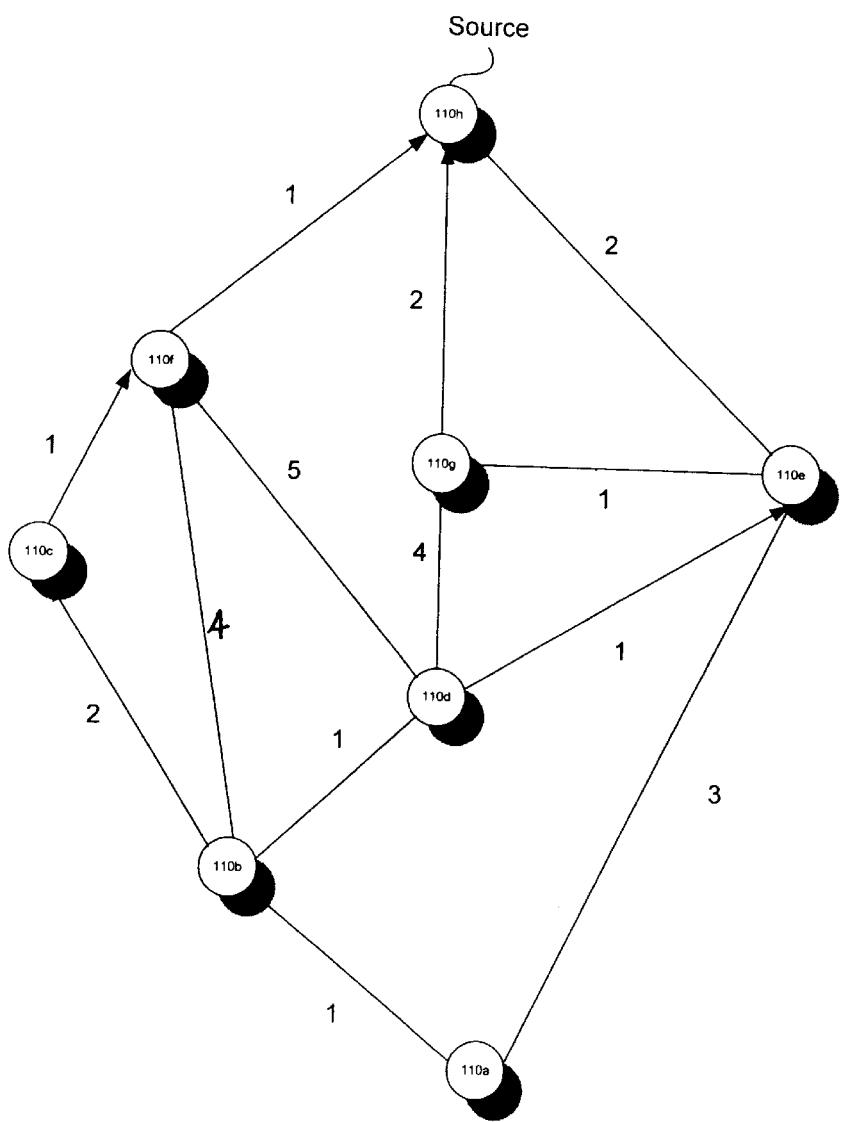
FIG. 4 depicts a directed acyclic graph for storing a single route from a source node to each destination node in a network according to one embodiment of the present invention.

The Dijkstra shortest-path algorithm computes a route to a destination node in O(L log N) (where L=the number of links and N=the number of nodes) time when implemented with a binary heap. Although advanced data structures can reduce the average and worst-case complexity, the shortest-path computation nevertheless incurs significant overhead in large networks. In computing a route to each destination, the Dijkstra algorithm generates a shortest-path graph where each node has a parent pointer to the upstream node in its route from the source as shown in FIG. 4. Extracting a route to a particular destination involves traversing these parent pointers and introduces complexity in proportion to the path length. For on-demand routing of a single connection, the construction of the shortest-path graph terminates upon reaching the destination. Continuing the computation to generate a route for every destination does not significantly increase the processing requirements and complexity remains O(L log N). This allows path precomputation schemes to amortize the overhead of the shortest-path calculation over multiple destination nodes.

FIG. 4 depicts a directed acyclic graph for storing a single route from a source node to each destination node in a network according to one embodiment of the present invention. Note that the nodes depicted in FIG. 4 correspond precisely to the domain layout depicted in FIG. 1 and form a directed acyclic subgraph of the original graph depicted in FIG. 1. Each node (110a–110h) originates a single parent pointer that points along a link of a shortest-path route to an upstream node in the network leading toward the source. Also shown in FIG. 4 are exemplary link cost metrics associated with each link. For example, the shortest path route from source node 110h to node 110a can be determined by tracing the parent pointers (beginning with node 110a) back to source node 110h. Thus, the lowest cost route from node source node 110h to node 110a consists of the route 110h –110f–110c–110b–110a with a total cost metric of 5.

Figure 5:
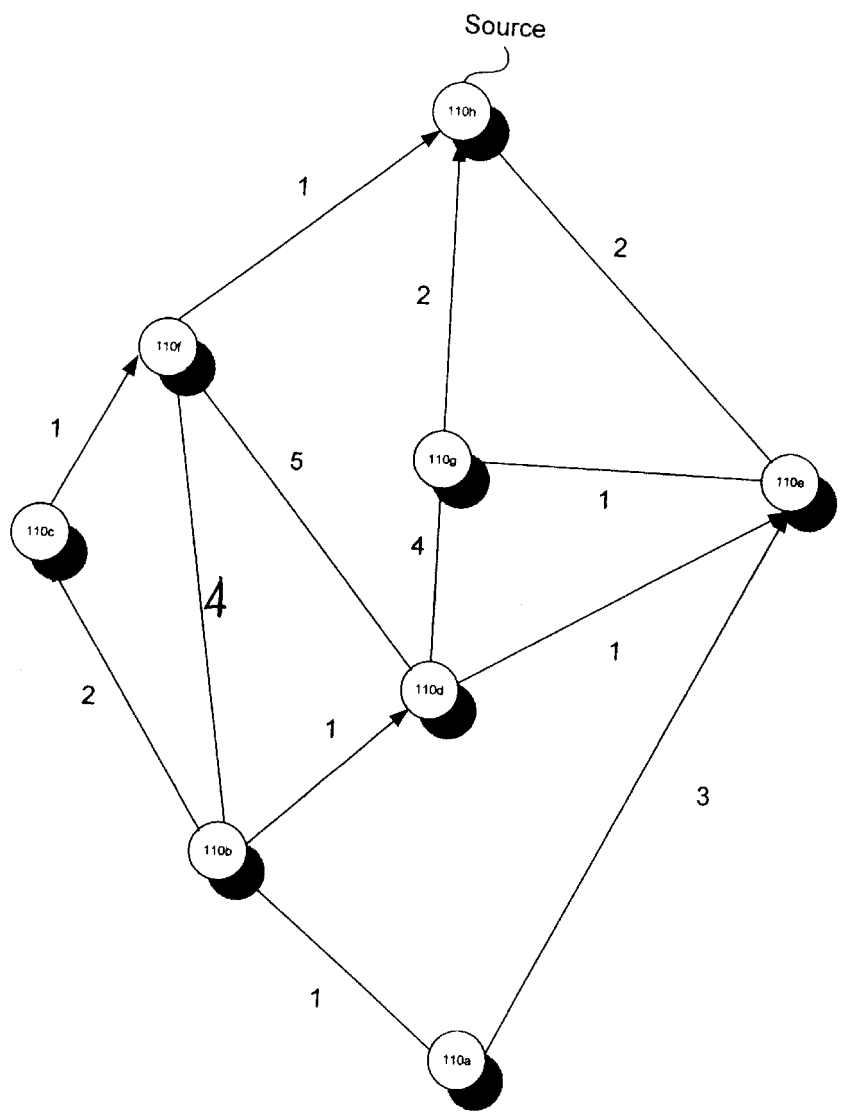
FIG. 5 depicts a directed acyclic graph for storing multiple, minimum-cost routes from a source node to destination nodes in a network according to one embodiment of the present invention.

According to one embodiment of the present invention, the compact data structure depicted in FIG. 4 is extended to store multiple, variable-length, equal-cost routes from a source node to destination nodes in a network. FIG. 5 depicts a directed acyclic graph for storing multiple, minimum-cost routes from a source node to destination nodes in a network according to one embodiment of the present invention. Note that as in FIG. 4, in FIG. 5 the nodes and parent pointers form a directed acyclic subgraph routed at the source of the original graph shown in FIG. 1. Also shown in FIG. 5 are exemplary link cost metrics associated with each link. For example, FIG. 5 represents three minimum-cost routes exist to destination switch 110a: 110h–110f–110c–110b–110a, 110h–110e–110a and 110h–110e–110d–110b–110a each having a total cost of 5.

Figure 6:
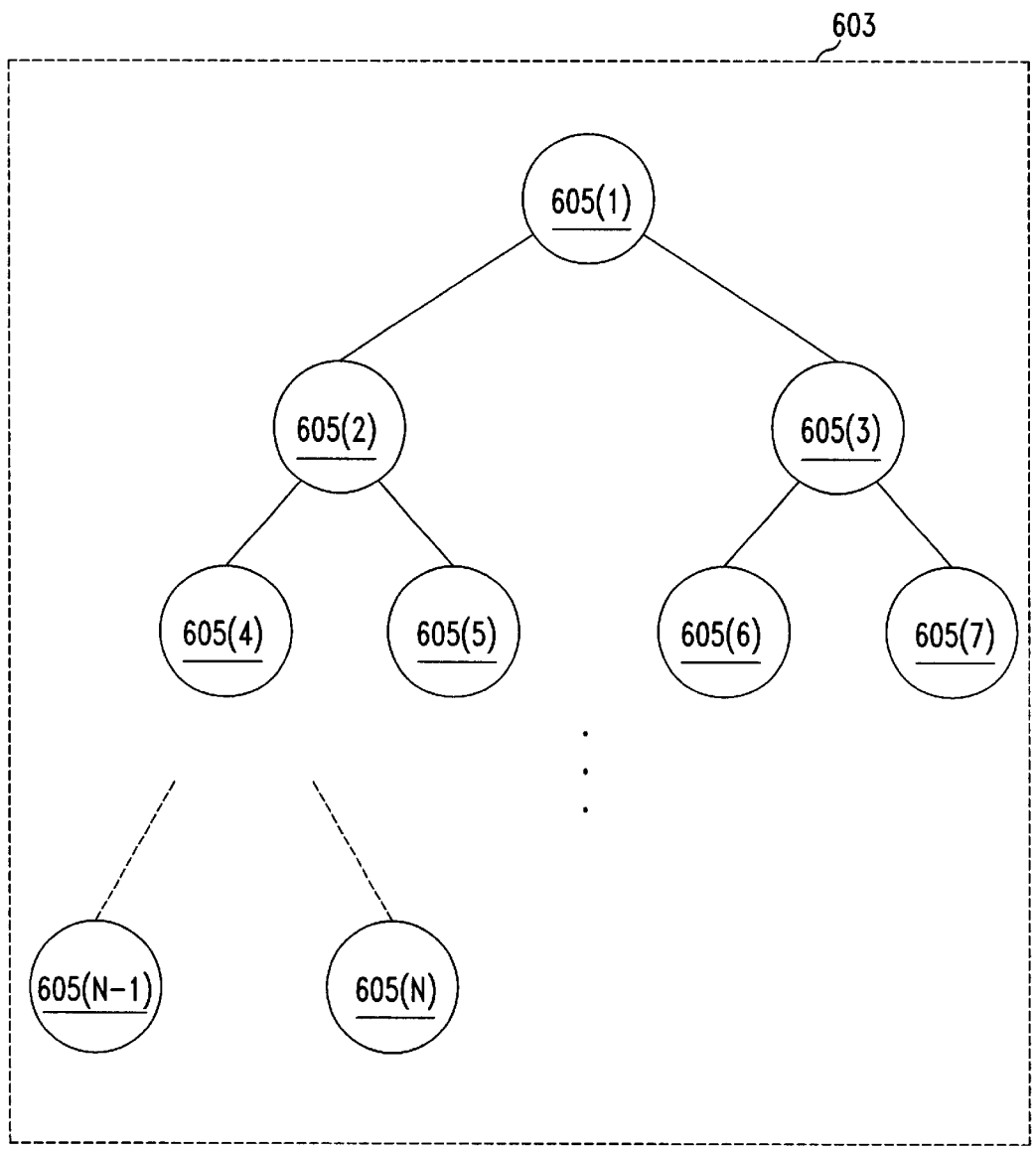
FIG. 6 depicts a binary heap data structure for storing information regarding a set of network nodes according to one embodiment of the present invention.

FIG. 6 represents a binary heap data structure for storing information regarding a set of network nodes according to one embodiment of the present invention. In particular, each node is associated with a node identifier, 605(1)–605(N), respectively. The heap architecture is used because it reduces the complexity of executing the Dijkstra shortest-path algorithm to O(L log N) (where N=the number of nodes and L=the number of links). A heap data structure may be implemented using pointers, between parent and children nodes or using a simple array. Each node in the heap is associated with a shortest-distance estimate parameter. Furthermore, according to one embodiment of the present invention, all nodes stored in the heap structure shown in FIG. 6 utilize an adjacency-list representation (not shown) for depicting the edges to neighbor nodes in the graph. According to an alternative embodiment of the present invention, an adjacency-matrix representation (not shown) is used instead to describe neighboring edges for each node.

FIGS. 7a—7f depict various data structures for representing a directed graph of multiple minimum-cost routes from a source node to destination nodes in a network such as that depicted in FIG. 5.

Figure 7A:
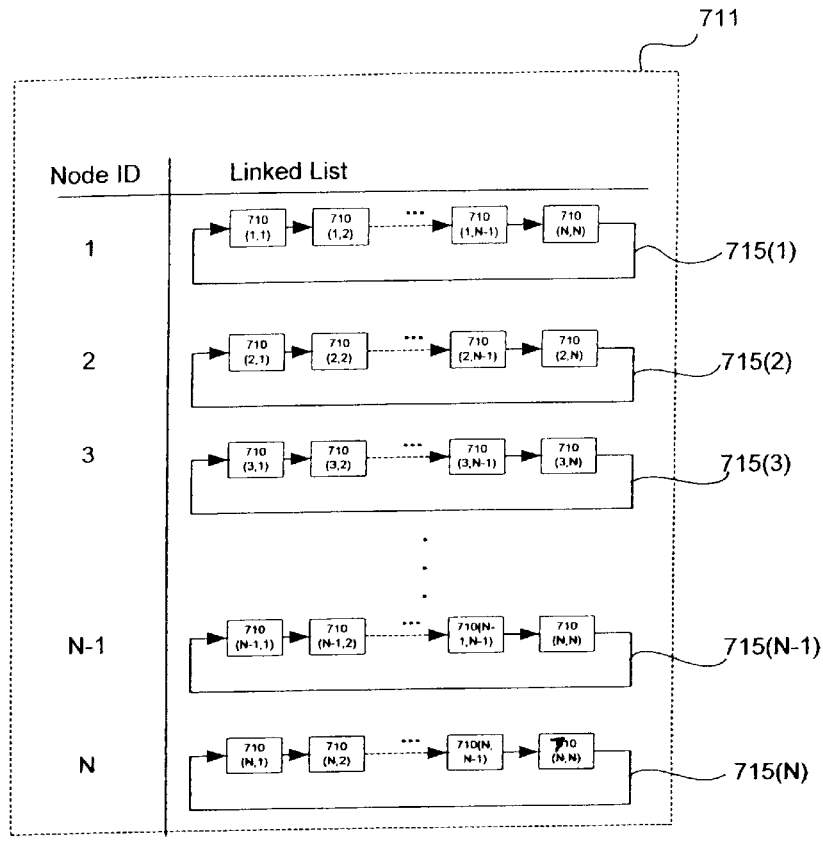
FIG. 7*a* depicts a data structure for representing multiple, minimum-cost routes from a source node to destination nodes in a network according to one embodiment of the present invention.

In particular, FIG. 7a depicts a data structure for representing multiple, minimum-cost routes from a source node to destination nodes in a network according to one embodiment of the present invention. This data structure is used to implement the directed acyclic graph shown in FIG. 5 and is derived form the network topology and link cost graph as characterized in FIG. 6.

According to one embodiment of the present invention, the acyclic subgraph of multiple minimum-cost routes is stored by associating each node in the graph with a circular linked list of parent pointers to facilitate simple traversal. According to an alternative embodiment, each node in the graph is associated with a bit-mask to indicate which upstream nodes reside on shortest-path routes. In particular, FIG. 7a depicts an array 711 of linked lists 715(1)–715(N). According to one embodiment, each linked list 715 is referenced with the syntax parent[nodeid], where nodeid represents a node identifier 605. Array 711 stores a set of circular linked list data structures 715(1)–715(N) that are associated with nodes 1-N, respectively. According to an alternative embodiment, only a pointer to a particular linked list is stored in array 711 (e.g., a pointer to the head of the linked list).

Each linked list 715(1)–715(N) contains a series of data objects 710(1,1)–710(N,N), each corresponding to a parent node of the associated node along minimum-cost routes in the network. The number of parent nodes in the linked list, of course, will vary for each node depending upon the network topology.

Figure 7B:
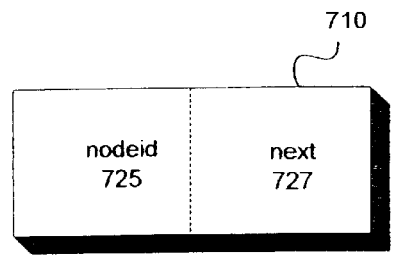
FIG. 7*b* depicts a data structure for a data object according to one embodiment of the present invention.

FIG. 7b depicts a data structure for a data object according to one embodiment of the present invention. Each data object 710 contains two fields, nodeid 725 and next 727 respectively. Nodeid field 725 corresponds to a particular node identifier that is a parent node of the node itself (e.g., 605). Next 727 is a pointer that points to the next data object in the linked list. That is, next 727 stores the node identifier (i.e., 605(1)–605(N)) of the next node in the linked list. Each linked list 710 is circular in structure so that the last node (i.e., 710 (N)) points to the first node (i.e., 710(1)).

FIG. 7c depicts an exemplary data structure for associating a set of nodes with a shortest distance estimate parameter according to one embodiment of the present invention. In particular, node IDs (1–N) are mapped to a shortest distance estimate 712(1) .... 712(N) respectively. This mapping is stored in a data structure, 706. According to one embodiment of the present invention data structure 706 is a simple one-dimensional array that is referenced with the syntax dist[nodeid].

FIG. 7d depicts an exemplary data structure for associating a set of links between nodes with a set of link costs according to one embodiment of the present invention. In particular, the cross product of all possible combinations of nodes IDs (1–N) are mapped to a cost value 720(1,1) ... 720(N,N) respectively. This mapping is stored in a data structure represented by 707. Of course, a particular entry in the matrix will be relevant only if there is a link between the two nodes corresponding to the entry. According to one embodiment of the present invention, a link cost between two nodes that are not linked is represented by an arbitrarily large value approaching ∞. According to one embodiment of the present invention data structure 707 is a simple two-dimensional array that is referenced with the syntax cost [nodeid, nodeid].

FIG. 7e depicts an exemplary data structure for associating a set of linked lists with a respective head pointer according to one embodiment of the present invention. In particular, data structure 714 stores a set of node id's (e.g., 605) where each node id is mapped to a respective head data object 710 in linked list 715 corresponding to the node id. According to one embodiment of the present invention, data structure 714 is a simple array. According to an alternative embodiment, rather than storing the head node data object 710, a pointer to the head node data object is stored instead.

FIG. 7f depicts an exemplary data structure for associating a set of linked lists with a respective current parent pointer according to one embodiment of the present invention. Note that data structure 717 is identical to data structure 714 in FIG. 7e. In particular, data structure 717 stores a set of node id's (e.g., 605) where each node ID is mapped to a respective candidate data object 710 in linked list 715. A candidate data object represents the data object storing a parent pointer that is currently under consideration along a minimum cost route in the network.

Figure 8:
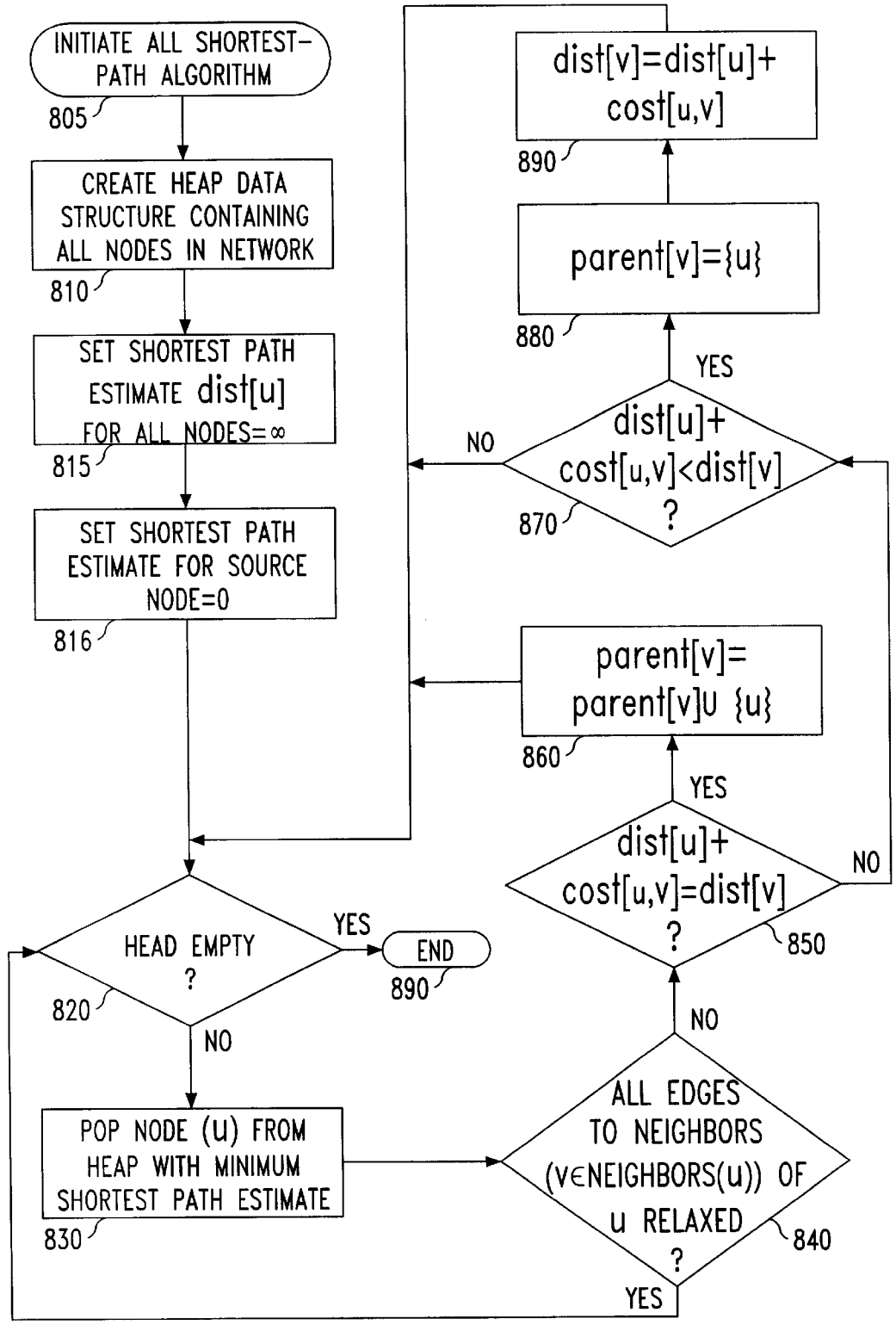
FIG. 8 is a flowchart depicting a series of steps for calculating and storing a directed acyclic graph of multiple equal-cost paths to each destination node in a network according to one embodiment of the present invention.

FIG. 8 is a flowchart depicting a series of steps for calculating and storing a directed acyclic graph of multiple equal-cost paths to each destination in a network such as that shown in FIG. 5 according to one embodiment of the present invention. As shown in FIG. 7a, each node in the graph has a circular list of its parent pointers or a bit mask to indicate which upstream nodes reside on the shortest-path routes. The algorithm uses a heap (e.g., FIG. 6) to visit the nodes in order of their distance from the source and relaxes each outgoing link. A parent pointer is assigned to a node if a link is on a minimum-cost route (so far) to the neighboring node. According to one embodiment of the present invention, to minimize the storage requirements and complexity of route extraction, the algorithm imposes a limit on the number of parents for each node.

In step 805, the all shortest-path algorithm is initiated. In step 810 a heap data structure (see FIG. 6) is created that contains node identifiers for all nodes in the network. In addition, data structures depicted in FIGS. 7a–7f are also created and initialized. According to one embodiment, all entries in these data structures are initially set to NIL. In step 815, the shortest path estimate for all nodes is set=∞ (i.e., dist[u] for all nodes in the network=∞). In step 816, the shortest path estimate for the source node is set to zero (i.e., dist[SOURCE_NODE_ID]=0).

In step 820 it is determined whether the heap is empty. If so, ('yes' branch of step 820) the procedure ends, step 890. If not ('no' branch of step 820), the node in heap holding the lowest minimum shortest path estimate is popped from the heap, step 830. In step 840, it is determined whether the edges to all neighbors (neighbor nodes may be determined from the adjacency-list representation of the graph) of the node previously popped from the heap are relaxed. If all edges to neighbor nodes have been relaxed ('yes' branch of step 840), the process returns to step 820 to determine whether the heap is empty. If not, in step 850 it is determined whether the shortest path estimate for the current node under consideration after relaxation is equal to the current shortest path estimate (i.e., dist[u]+cost[u,v]==dist[v]?). If so ('yes' branch of step 860), a parent pointer is assigned from the current node under consideration to point to the previously popped node (i.e., parent[v]=Union(parent[v], {u}). This corresponds to adding a link to the circular linked list 815 assigned to the previously popped node. The process then returns to step 820 to determine whether the heap is empty.

If the test in step 850 is not true, ('no' branch of step 850), in step 870 it is determined whether the current edge to the node under consideration {u} should be relaxed (i.e., whether dist[u]+cost[u,v]<dist[v]). If so ('yes' branch of step 870), in step 880, a parent identifier is assigned to the node u under consideration (step 880) and the edge to node u is relaxed (i.e., dist[v] is set to be equal to dist[u]+cost[u, v]). If not ('no' branch of step 870), the process returns to step 820 to determine whether the heap is empty.

The following pseudo-code pertains to the process depicted in FIG. 8 according to one embodiment of the present invention:

```
0:  Heap=set of all N nodes;                        #visit each node
1:  while (Heap is not empty) {
2:      u=PopMin(Heap);                             #remove min node
3:      for each node v∈Neighbors(u) {              #relax each link
4:          if (dist[u]+cost[u,v]==dist[v])         #equal route?
5:              parent[v]=parent[v]U{u};            #add parent pointer
6:          else if(dist[u]+cost[u,v]<dist[v]) {    #cheaper route
7:              parent[v]={u};
8:              dist[v]=dist[u]+cost[u,v];
9:          }
10:     }
11: }
```

The likelihood of having multiple minimum-cost routes to a destination depends on the link cost function and the underlying network topology. According to one embodiment of the present invention, in order to increase the chance of "ties" in the route computation, link costs (i.e., 720) are limited to a small number of discrete values (e.g., C=5 or 10, where C represents the number of possible values for link costs). Although fine-grain link costs (larger values of C) usually result in lower blocking probabilities, performance evaluation revealed that a moderately coarse link-cost function does not significantly degrade performance as describe below. In addition, performance evaluation revealed that when link-state information is somewhat out-of-date, the benefit of a fine-grain link cost function is greatly diminished. In addition, coarse-grain link costs offer the advantage of reducing the processing requirements of the shortest-path computation by reducing heap complexity. In particular, using coarse grain link costs, the complexity of Dijkstra's algorithm to compute multiple minimum-cost routes decreases from $O(L \log N)$ to $O(L+CN)$ where L=the number of links in the network, while more advanced data structures offer further reduction. Hence, coarse-grain link costs become particularly appropriate in large well-connected networks (large L and N) where switches have out-of-date link-state information.

Rather than extracting and caching routes in a separate data structure, according to the present invention, the routes are stored in the shortest-path graph (e.g., FIG. 5) and the extraction operation is delayed until a connection request arrives. During the path extraction, the source applies the most recent link-state information in selecting a route. The extraction process operates on the subgraph of nodes and parent pointers along minimum-cost routes to the destination.

Figure 9:
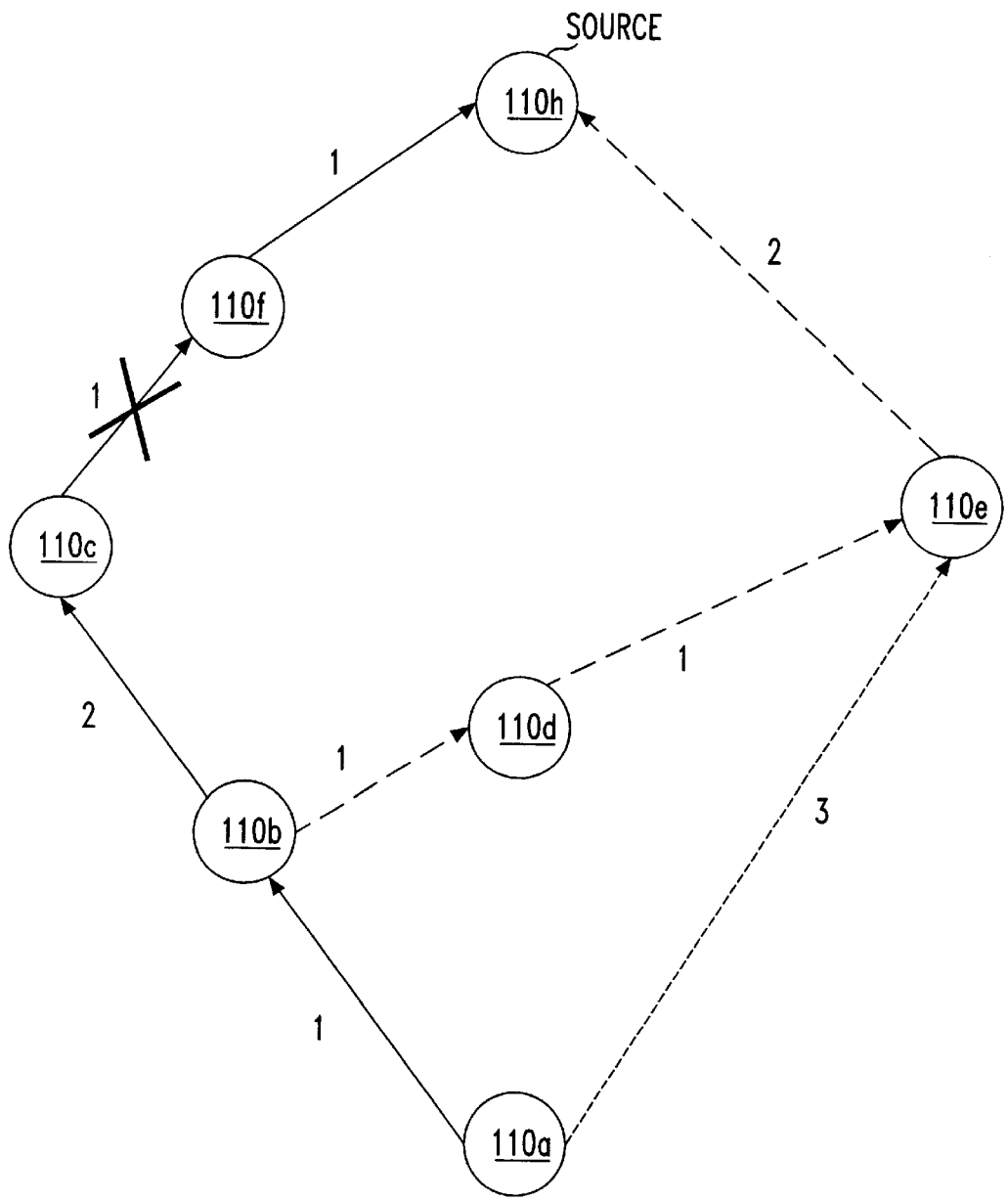
FIG. 9 is a graph depicting an example of an extraction process according to one embodiment of the present invention.

FIG. 9 is a graph depicting an example of the extraction process according to one embodiment of the present invention. As shown in FIG. 9, three equal cost routes exist from source node 110h to destination node 110a. The source node 110h could conceivably run a new Dijkstra computation on the subgraph shown in FIG. 9 to select the best precomputed route. However, according to one embodiment of the present invention, the first route is extracted by following a single set of parent pointers indicated by the solid route shown in FIG. 9. The present invention extracts a route from a directed acyclic subgraph (e.g., FIG. 5) by performing a depth-first search through the reduced graph to extract the first feasible route based on the current link-state information and the bandwidth requirement of the new connection. If the extraction process encounters a link that does not appear to have enough available bandwidth (indicated by the 'x' between nodes 110c–110f), the algorithm performs a backtracking process by locating a different parent pointer. That, is the algorithm searches for a new path that excludes the offending link.

A depth-first search and the feasibility check effectively "simulate" hop-by-hop signaling using the most recent link-state information. However, this hop-by-hop signaling is conducted purely locally at the source and comprises much less work than discovering an infeasible link by sending and processing signaling messages in the network.

Figure 10:
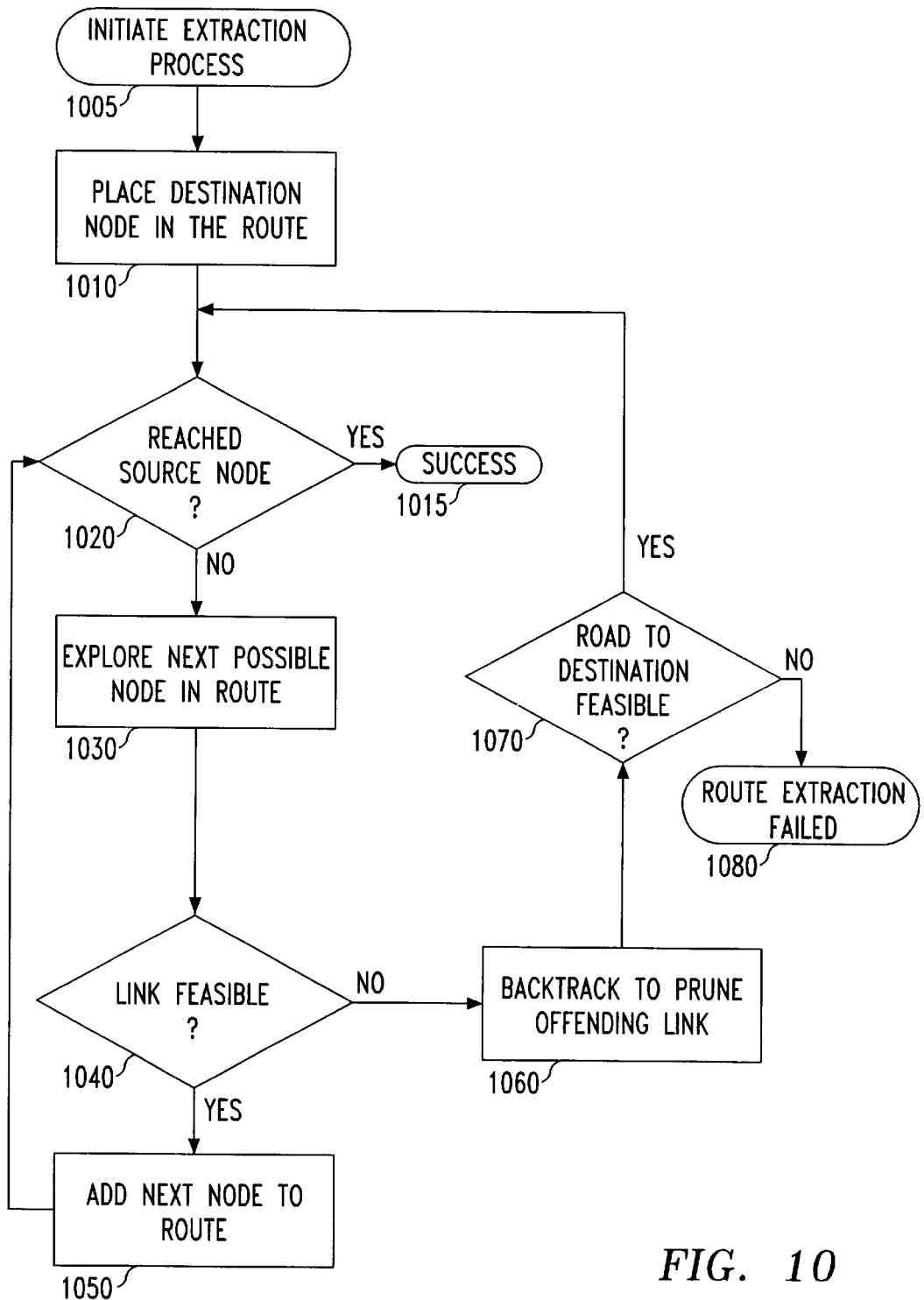
FIG. 10 is a flowchart depicting a set of steps for extracting a network route according to one embodiment of the present invention.

According to one embodiment of the present invention, the extraction process operates, by starting at the destination node, building a stack of the nodes in the route from the source. FIG. 10 is a flowchart depicting a set of steps for extracting a network route according to one embodiment of the present invention. In step 1005 the process is initiated. In step 1010 the destination node is placed in the, route. In step 1020 it is determined whether the source node has been reached. If so ('yes' branch of step 1020), the route has been extracted successfully (step 1015). Otherwise, the next possible node in the route is explored in step 1030. As described in more detail below, the next possible .node is determined by examining the node point to by a current candidate parent pointer, which is associated with each respective node. In step 1040, it is determined whether the link form the current candidate node in the route to the next possible node is feasible. According to one embodiment of the present invention, this feasibility check is implemented by comparing the resources required by the connection request with the most recent link-state pertaining to the link. If the link is feasible ('yes' branch of step 1040), the node is added to the route in step 1050 and the process returns to step 1020 to determine whether the source node has been reached.

If the link is not feasible ('no' branch of step 1040), the offending link is pruned from the route using a backtracking procedure in step 1060. This backtracking procedure, as described in more detail below, may be as simple as selecting a next parent pointer from the circular linked list of parent pointers for the current node. However, if all of the parent pointers for the current node have been explored, the current node may have to be pruned from the route. This process is described in more detail below. In step 1070, it is determined whether the route to the destination is feasible at all. A route may not be feasible if during the backtracking process it is determined that no route exists that can exclude the offending link. If no route is feasible ('no' branch of step 1070), the route extraction process fails (step 1080). Otherwise, the process continues by returning to step 1020.

The following pseudo-code pertains to the process depicted in FIG. 10 according to one embodiment of the present invention:

```
0:  push(dest);                                 #start at destination node
1:  ptr[dest]=head[dest];                       #start at dest's first parent
2:  while ((top !=NULL) and (top?=src)          #continue till reaching src
3:      new=ptr[top].nodeid;                    #explr. parents of top nde.
4:      if(feasible(new, top)) {                #is link feasible?
5:          push(new);                          #explr. next node in route
6:          ptr[new]=head[new];
7:      }
```

```
8:      else {
9:          while (ptr[top].next==head[top])
10:             pop();
11:         if(top !=NULL)
12:             ptr[top]=ptr[top].next;      #seq. to next parent ptr.
13:     }
14: }
```

Starting at the destination node, the algorithm builds a stack of the nodes in the route from the source. Each node, as described above, has a circular list of parent pointers, starting with the head parent. A second pointer (ptr) is used to sequence through the list of one or more parents until ptr cycles back to head. The pointer (ptr) points to a current candidate parent pointer under consideration for each node in the network. Each iteration of the while loop considers the link between the node at the top of the stack and its current candidate parent (pointed to by the ptr pointer and pointed to by new in line 3). If the link is feasible, new is added to the stack and its parents are considered in the next iteration (lines 4–7). Otherwise, if the feasibility check fails, the next parent is considered. In the alternative (i.e., if there is no next parent that hasn't already been considered), a backtracking procedure is implemented to find a node whose parent list has not been exhausted (lines 9–12). The algorithm terminates when the source is reached via a feasible path (i.e., top==src) or when the path stack becomes empty (top ==NULL) because no feasible path was found. In the former case, the route is read by popping the stack from source to destination.

According to one embodiment of the present invention, the algorithm may be improved by taking advantage of knowledge that certain routes are feasible. Using the route extraction algorithm described above, subsequent connection requests may have to duplicate some of the same backtracking as a previous request, particularly since the traversal always starts with the parent marked by the head pointer. According to one embodiment of the present invention, one or more pointer manipulations are performed at the end of a successful route extraction to capitalize on finding a feasible route.

In particular, as each node in the route from the path stack is popped, the head pointer is changed so that a subsequent extraction attempt for the same destination (or any destination along the path) visits a different set of links. According to one embodiment of the present invention, the parent that was selected for the route becomes the new head. This may be accomplished with the code head[node]=ptr[node]. This amounts essentially to "sticky" routing where the first route that was found to be feasible in the last extraction is tried first in a subsequent extraction. In an alternative embodiment, a round-robin type of approach is employed in which the parent succeeding the current parent used in the route is used. This may be accomplished with the code head[node]=ptr[node].next. This policy attempts to perform load balancing by alternating the links that carry traffic for a set of destinations.

The alternative embodiments differ from traditional alternative routing where the switch rotates among a set of cached paths. Here the rotation for one destination node influences the order in which links are visited for other destination nodes along the path. Moreover, changing the position of the head pointer is simpler than extracting and rotating entire paths and may actually provide added benefit because the alternate routing is performed on a more global scale.

Performance Results

The routing process described by the present invention was evaluated under a range of recomputation periods and link-state update policies. The performance evaluation revealed that precomputation of an all minimum-cost graph, coupled with a feasibility check approximated the performance benefits of on-demand routing and also provided the low computational overhead of path caching. The feasibility check was especially effective in reducing the likelihood of expensive signaling failures, even when the link-state information was out-of-date.

To evaluate the cost-performance trade-offs of precomputed routes, an event-driven simulator that modeled link-state routing at the connection level was developed. The simulator operated by choosing a route for each incoming connection based on a throughput requirement (bandwidth b) and the available bandwidth in the network, based on the source's view of link-state information. Then, hop-by-hop signaling was employed to reserve the requested bandwidth at each link in the route. That is, if a link had a reserved bandwidth with utilization u, admitting the new connection increased the reservation to u=u+b. A signaling failure was determined to occurs a link in the path could not support the throughput requirement of the new connection (i.e., if u+b>1). For the simulations, it was assumed that a connection blocked after a signaling failure, although some experiments were run that allowed multiple signaling attempts. Blocking could also occur during path selection if the feasibility check suggested that none of the candidate routes could support the new connection. However, these routing failures impose less of a burden on the network than signaling failures, which consume resources at downstream nodes. Although the experiments did not explicitly model propagation and processing delays, an estimate of average set-up delay could be ascertained by analyzing latency through the connection blocking rate and frequency of route computation.

The simulation was configured so that the source selected a minimum-hop route with the least cost; previous studies have indicated that algorithms with a strong bias toward minimum-hop routes almost always outperform algorithms that do not consider the hop-count. See, e.g., R. Gawlick, C. Kalmanek and K. Ramakrishnan, "Online routing for virtual private networks," *Computer Communications*, vol. 19, pp. 235–244, Mar. 1996. To distinguish between paths of the same length, each link was assigned a cost in the set $\{1/C, 2/C, \ldots, C/C\}$. A link with reserved capacity u was assigned the cost $[(u^2 \cdot (C-1)]+1)/C$. This cost function is exemplary and other cost functions are possible. Experiments with link-cost functions revealed that a second order exponent biases away from routes with heavily-loaded links, without being too sensitive to small changes in link-state information. For simplicity, it was assumed that links were bi-directional, with unit capacity in each direction. The routing algorithms were evaluated on a "well-known" core topology and a uniformly connected 125-node 5-ary 3-cube topology (with 5 nodes along each of the 3 dimensions). The relationship between size and connectivity in the 5-ary 3-cube is similar to existing commercial networks and allowed the study of potential benefits of having multiple minimum-hop routes between pairs of nodes.

The simulation studies were configured so that connection requests arrived at the same rate at all nodes and destinations and were selected uniformly. Connection holding times were modeled to have a mean of 1 and follow a Pareto distribution with shape parameter 2.5 to capture the heavy-tailed nature of connection duration. Connection interarrival times were exponentially distributed with mean $1/\lambda$, and requested bandwidths were uniformly distributed with equal spread about a mean size b. The simulations focused on mean bandwidth in the range of 2–3% of link capacity. While smaller bandwidths may be more realistic, the large requests provided some insight into the behavior of high-bandwidth multimedia traffic (e.g., video). Also, smaller bandwidths result in very low blocking probabilities, making it very difficult to gain sufficient confidence in the simulation results in a reasonable time. With a connection arrival rate of $\lambda$ at each of N nodes, the offered network load is $\rho=\lambda N l \overline{bh}/L$, where L is the number of links and h is the mean distance (in hops) between nodes, averaged across all source-destination pairs. FIG. 11 is a chart summarizing the simulation parameters for the two network topologies tested according to one embodiment of the present invention.

The initial simulation experiments compared the performance and overhead of the routing algorithms under accurate link-state information. The background period for path precomputation was varied. Each switch was also permitted to recompute its shortest-path graph when the route extraction did not produce a candidate route (i.e., route failed due to feasibility checks) and after a signaling failure. Because only one signaling attempt was allowed for each connection, recomputing after a signaling failure benefits future connection request arrivals. Single-route algorithms, which use a precomputed shortest-path graph with only one route to each destination as shown in FIG. 4, were compared with the multiple-route approach as shown in FIG. 5. Of course, the multiple-route approach offers greater flexibility than the single-route approach by allowing the source to perform feasibility checks on several paths in the graph. In addition, two on-demand algorithms that compute routes on a per-request basis were compared with the precomputation algorithms. The first on-demand algorithm utilized a link-cost discretization of C=5, identical to the precomputed algorithms, and the second used a discretization limited only by machine precision (referred to as C=∞).

Accurate Link-State Information

Figure 12B:
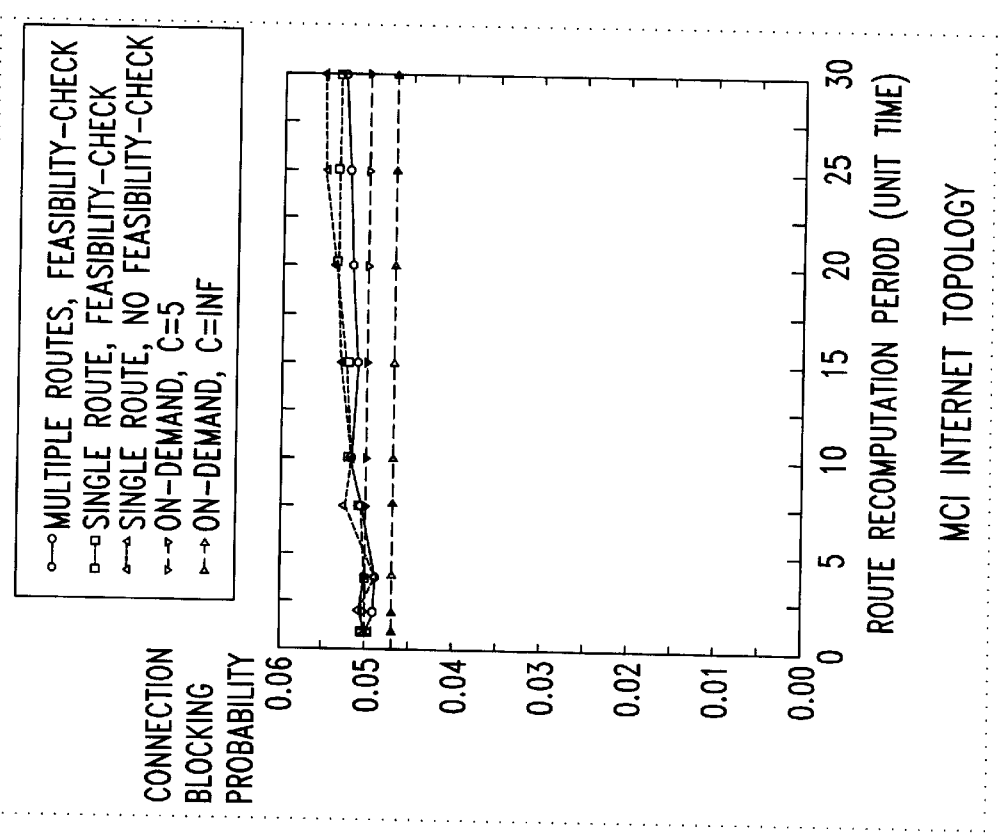
FIG. 12b is a graph showing plots of the connection blocking probability as a function of the background path recomputation period under accurate link state information for a 5-ary 3-cube topology according to one embodiment of the present invention.
Figure 12A:
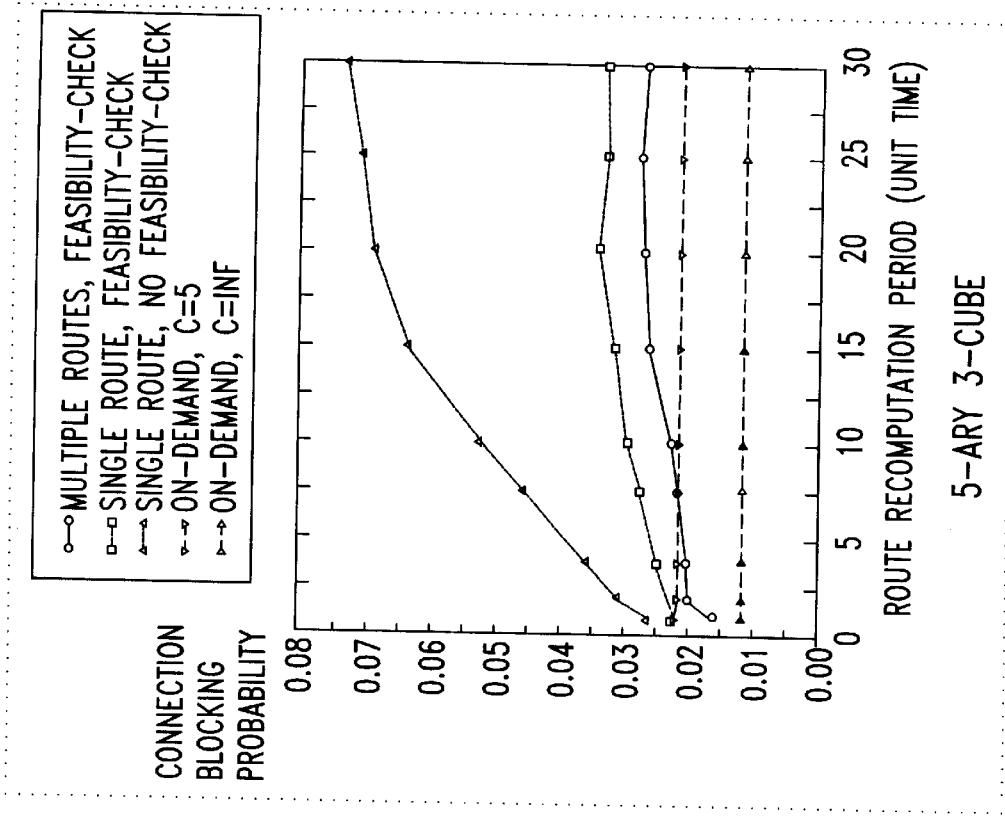
FIG. 12a is a graph showing plots of the connection blocking probability as a function of the background path recomputation period under accurate link state information for a core topology according to one embodiment of the present invention.

FIGS. 12a–12b compare the performance and overhead of various routing algorithms under accurate link-state information according to one embodiment of the present invention.

FIG. 12a is a graph showing plots of the connection blocking probability as a function of the background path recomputation period under accurate link state information for a core topology according to one embodiment of the present invention. In particular, FIG. 12a plots the connection blocking probability as the recomputation period is increased to more than 30 times the connection interarrival time. The precomputation algorithms performed well, relative to the more expensive on-demand schemes. The experimental results showed that feasibility checking substantially improved performance over traditional path-caching techniques, allowing the use of much larger computation periods. In addition, under accurate link-state information, feasibility checking completely avoided signaling failures by correctly "simulating" the effects of signaling during the route extraction process. This was particularly helpful in the 5-ary 3-cube network, since the richly-connected topology frequently has an alternate shortest-path route available when the first choice is infeasible. Other experiments illustrated that, without a feasibility check, precomputed routing could only achieve these performance gains by allowing multiple signaling attempts for a connection, at the expense of longer set-up delays and higher processing requirements.

FIG. 12a shows that the ability to precompute multiple candidate routes does not substantially reduce the blocking probability, since the sparsely-connected core topology typically does not have multiple shortest-path routes, let alone multiple routes of equal cost. In contrast, FIG. 12b shows that the 5-ary 3-cube experiments provides a more substantial performance benefit. A more significant gain under nonuniform traffic loads was expected, since alternate routes enable connections to circumvent regions of congestion. This is especially true during transient fluctuations in network load caused by bursty connection arrivals or rerouting after a link failure. In these cases, precomputation of multiple routes allowed the source to survive longer intervals of time without computing a new shortest-path graph. The multiple precomputed routes algorithm coupled with the feasibility test performed almost as well as on-demand routing with the same number of cost levels. However, using C=∞ offered a noticeable performance advantage since the accurate link-state information enabled the fine-grain link-cost function to locate the "best" route.

Figures 13A, 13B:
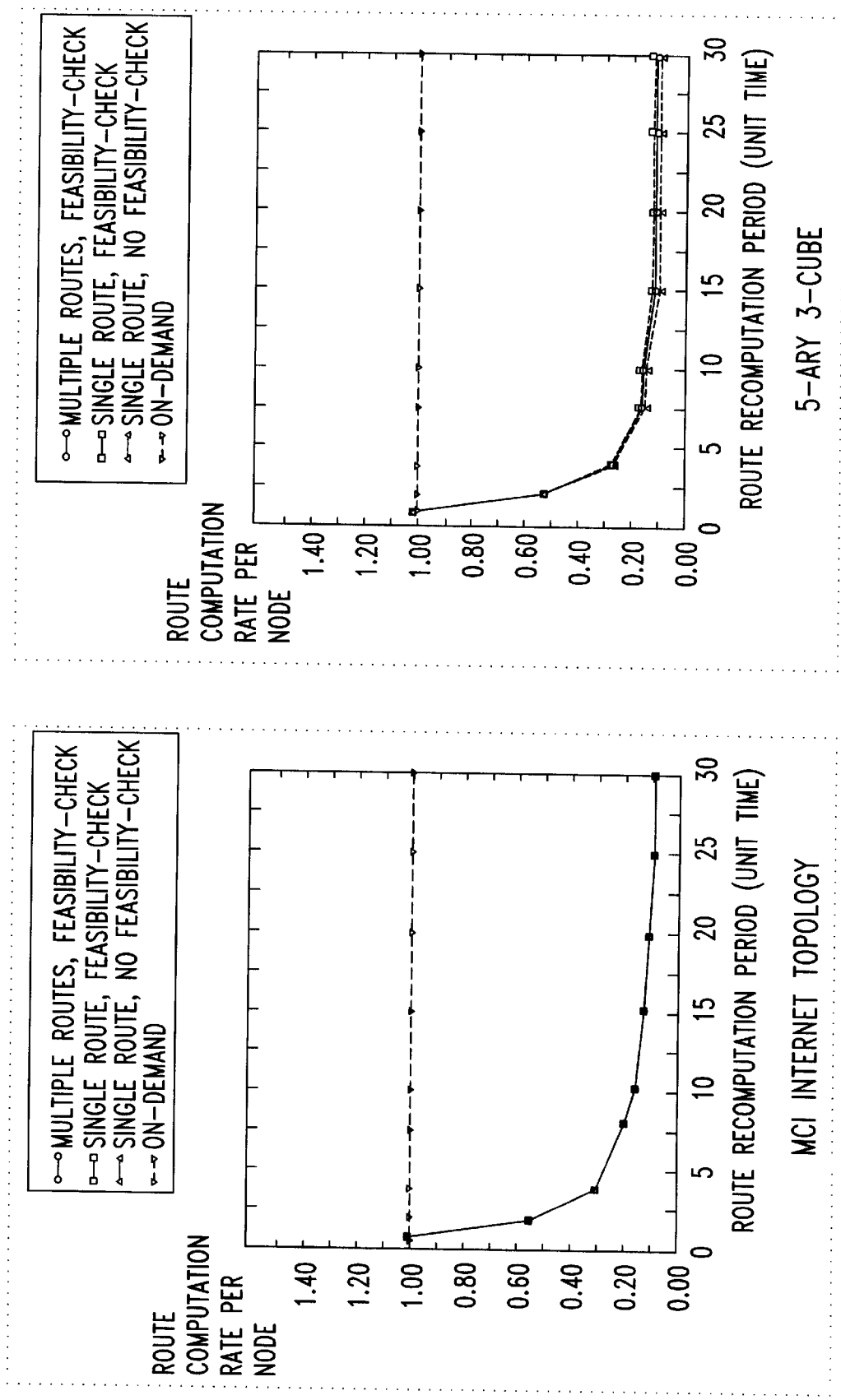
FIG. 13a is a graph showing plots of the route computation frequency as a function of the background path recomputation period under accurate link state information for a 5-ary 3-cube topology according to one embodiment of the present invention.
FIG. 13b is a graph showing plots of the route computation frequency as a function of the background path recomputation period under accurate link state information for a core topology according to one embodiment of the present invention.

FIGS. 13a–13b are graphs plotting route computation frequency as a function of background path computation period under accurate link-state information for both the core topology and 5-ary 3-cube topologies according to one embodiment of the present invention. FIGS. 13a14 13b show that the lower blocking probabilities measured for on-demand routing introduced a tradeoff of a significant cost in processing load. In addition, the precomputation schemes involved much lower complexity for each route computation relative to the C=∞ on-demand algorithm. Comparing the different precomputation algorithms, the processing load was dominated by the background recomputation of the shortest-path graph though the feasibility test introduced a slight increase in triggered recomputations. As the period is increased, the plots flatten since triggered recomputations become increasingly common for all of the algorithms. Although disabling these triggered recomputations resulted in more predictable processing overheads, additional simulation experiments (not shown) indicated that this substantially increased the blocking probability.

Inaccurate Link-State Information

Figure 14B:
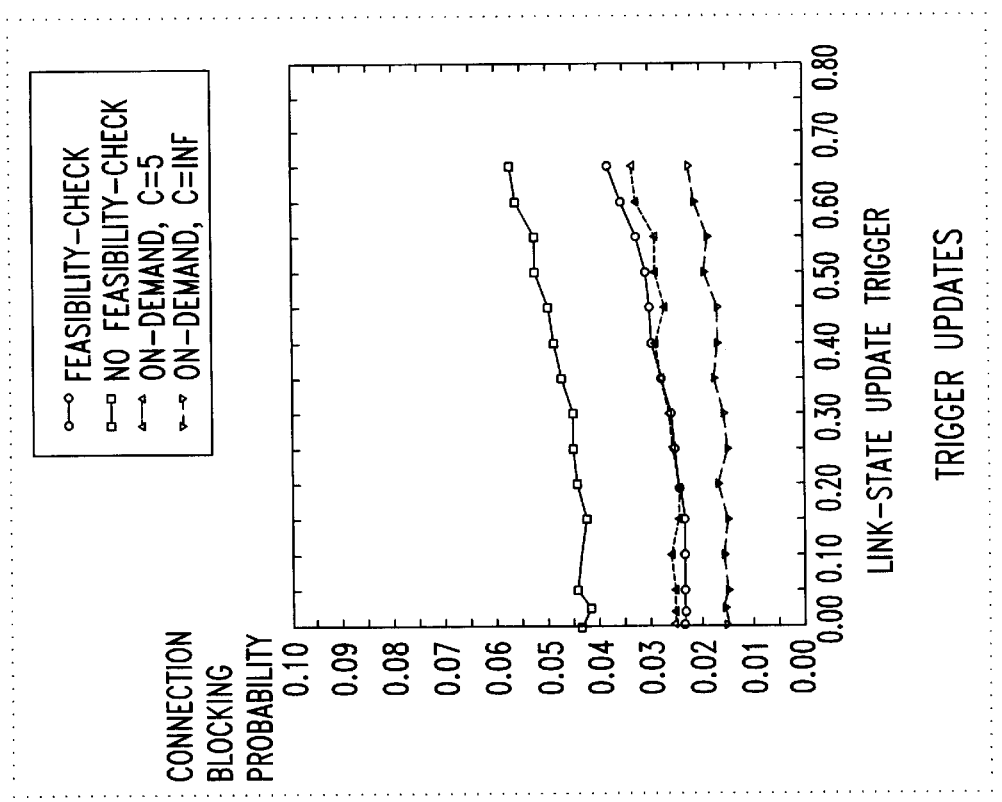
FIG. 14b is a graph showing plots of the blocking probability as a function of link-state update period under stale link-state with triggered link-state updates for a 5-ary 3-cube topology according to one embodiment of the present invention.
Figure 14A:
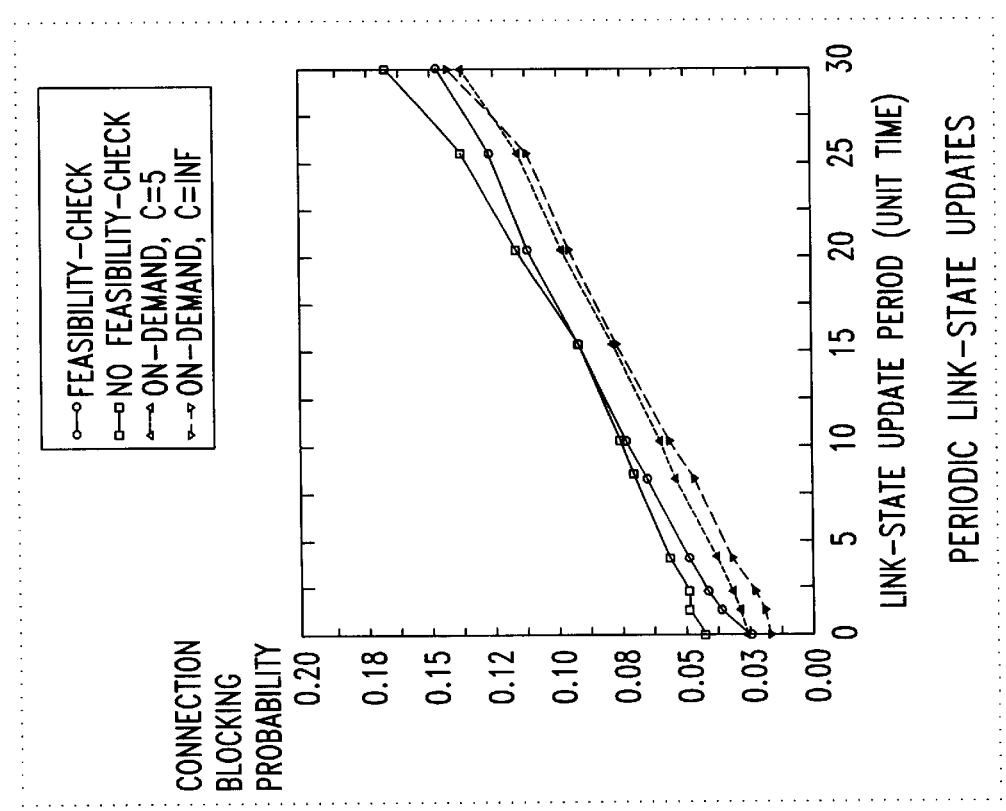
FIG. 14a is a graph showing plots of the blocking probability as a function of link-state update period under stale link-state with periodic link-state updates for a 5-ary 3-cube topology according to one embodiment of the present invention.

FIGS. 14a–14b are graphs plotting the blocking probability for the 5-ary 3-cube topology for periodic and triggered link-state updates with a background path computation period of 5 time units according to one embodiment of the present invention. As the staleness of link-state information increases, the C=∞ and C=5 curves gradually converge since fine-grain link costs offer progressively less meaningful information about network load. However, FIG. 14a shows that large link-state update periods were also found to degrade the effectiveness of the feasibility check in the precomputed routing scheme. Periodic updates can lead the source switch to mistakenly identify infeasible links as feasible and feasible links as infeasible. When link-state information is extremely stale (e.g., an update period that is 20 times larger than the mean connection interarrival time), signaling blindly without a feasibility check offered better performance. Under such large update periods, none of the QoS-routing algorithms performed well. Under the same network and traffic configurations, even static shortest-path routing (not shown) was able to achieve a blocking probability of 16%. Experiments with the core topology configuration did not show as much benefit from feasibility checking due to the lower number of shortest-path routes although the feasibility test did reduce the likelihood of signaling failures.

Despite the effects of large update periods, the feasibility check nevertheless offered significant advantages under more reasonable levels of link-state staleness. This is particularly apparent when link-state updates were triggered by a change in the available link capacity as shown in FIG. 14b. For example, a trigger of 0.2 corresponded to spawning a link-state update message whenever available capacity changed by 20% since the last update due to the establishment and termination of connections. Triggered link-state updates, like triggered path recomputations, generate new routing information during critical fluctuations in network load. Under triggered link-state updates switches typically have accurate information about heavily loaded links even for large trigger values. Consequently, the connection blocking probability was found to be fairly insensitive to the trigger across all routing algorithms. In addition, feasibility checking was found to remain effective across the range of update triggers and was competitive with on-demand routing (with C=5) in contrast to the results for update periods as shown in FIG. 14a. Experiments also revealed that using triggered updates allowed feasibility checking to reduce blocking even in the core topology even though the difference between feasibility and no feasibility checking was less significant than in the 5-ary 3-cube.

Although the blocking probability remained nearly constant as a function of the link-state trigger, small triggers resulted in fewer signaling failures as long as the source performed a feasibility test. In contrast, signaling failures accounted for all connection blocking when routing did not utilize feasibility checking. As the trigger was increased, it was found that the feasibility test sometimes mistakenly concluded that a heavily-loaded link was feasible and the connection was blocked in signaling rather than experiencing a routing failure. Nevertheless, even for a 50% trigger, signaling failures only contributed 30% of the connection blocking when using feasibility checking. Despite the fact that periodic updates introduce significant staleness and worsen overall connection blocking, feasibility checking was nevertheless found to avoid signaling for connections that ultimately block between 30–40% of the time. The ability of feasibility checking to reduce blocking inside the network is an important benefit since signaling failures consume processing resources and delay the establishment of other connections. Routing failures, on the other hand, are purely local and do not consume additional resources beyond the processing capacity of the source switch.

Examining the blocking relative to hop-count revealed that feasibility checking at the source also aided in routing connections between distant source-destination pairs. Since bandwidth must be reserved on a greater number of links, signaling blindly without checking recent link-state was found to have a lower probability of finding a successful route. Other experiments revealed that when a hold-down timer was used to impose a minimum time between consecutive update messages, the blocking probability rose slightly for all algorithms, though the benefit of feasibility checking remained. The hold-down time was useful, however, in reducing link-state update overhead, especially when using small trigger levels. For example, with a hold-down time equal to the mean connection interarrival time, the update generation rate could be reduced by over 35% for triggers in the range 0–0.1. Moreover, even with a hold-down timer, coarser triggers were found not to degrade performance. The combination of triggered updates and a small hold-down timer, coupled with feasibility checks and multiple precomputed routes was found to offer an efficient and effective approach to QoS routing in large networks.

What is claimed is:

1. A method for computing a selected route from a source node to a destination node in a network using a depth-first search, wherein the selected route is represented by a stack data structure, comprising the steps of:
   (a) storing a directed graph of nodes, links and link costs using a first data structure, wherein the first data structure associates each node other than the destination node with at least one parent pointer that points to a node;
   (b) selecting a link from a current node to a next node;
   (c) determining feasibility of the link using a recent link state;
   (d) if the link is feasible, including the next node in the selected route, wherein the step of including the next node in the selected route further includes the steps of:
      (i) pushing the next node on the stack data structure; and
      (ii) setting the current node to be the next node;
   (e) if the link is not feasible, excluding the next node from the selected route, wherein the step of excluding the next node from the selected route further includes the steps of:
      (i) determining whether all parent pointers associated with the current node have been considered;
      (ii) if all parent pointers associated with the current node have not been considered, setting the next node to a node pointed to by a parent pointer that has not been considered;
      (iii) if all parent pointers associated with the current node have been considered, executing the steps of:
         (A) removing the current node from the route;
         (B) setting the current node to a previous node in the route;
         (C) repeating steps (i)–(iii) until one of a node is found that may be included in the route and it is determined that there exists no node that may be included in the route; and
   (f) repeating steps (b)–(e) until one of the destination node is reached and a route cannot be computed to the destination node.

2. The method according to claim 1, wherein step (iii(A)) further includes the step of popping a node from the stack data structure.

3. The method according to claim 1, wherein step (iii(B)) further includes the step of setting the current node to the node popped from the stack.

4. The method according to claim 1, wherein the first data structure associates each node in the graph with a linked list of parent pointers that respectively point to nodes in the graph.

5. The method according to claim 4, wherein each linked list is associated with a head pointer that points to a head of the linked list and a current parent pointer under consideration.

6. The method according to claim 5, wherein step (i) further includes the step of determining whether a next parent pointer in the linked list following the parent pointer pointed to by the current parent pointer is the head.

7. The method according to claim 5, wherein step (ii) further includes the step of setting the current parent pointer to point to the next parent pointer.

8. The method according to claim 5, wherein the step of ranking the at least one possible route further includes the step of setting the head pointer of each linked list to be equal to the current parent pointer associated with the linked list.

9. The method according to claim 5, wherein the step of ranking the at least one possible route further includes the step of setting the head pointer of each linked list to be equal to a respective next pointer following the current parent pointer associated with the linked list.

10. A method for calculating and storing a directed graph of network routes comprising the steps of:
    (a) storing a plurality of nodes, links and link costs in a data structure;

(b) associating each node with a lowest cost estimate parameter;

(c) if the data structure contains at least one node, executing the steps of:

(i) removing a minimum node from the data structure;

(ii) if a sum of the lower cost estimate parameter associated with the minimum node and a link cost from the minimum node to an adjacent node equals the lowest cost estimate parameter associated with the adjacent node, executing the step of assigning a pointer associated with the adjacent node to point to the minimum node;

(iii) if the sum of the lowest cost estimate parameter associated with the minimum node and the link cost from the minimum node to an adjacent node is less than the lowest cost estimate parameter associated with the adjacent node, executing the steps of:

(A) assigning a pointer to the adjacent node to point to the minimum node;

(B) setting the lowest cost estimate parameter associated with the adjacent node to be equal to the sum of the lowest cost estimate parameter associated with the minimum node and the link cost from the minimum node to the adjacent node.

11. The method according to claim 10, wherein the data structure is a heap.

12. The method according to claim 10, wherein each node is associated with a circular linked list storing at least one pointer that points to parent node.

13. The method according to claim 10, wherein the link costs are discrete.

14. A network node comprising:

an interface for receiving packet data;

a second interface for transmitting packet data;

a processor adapted to:

(a) store a directed graph of nodes, links and link costs using a first data structure;

(b) select a link from a current node to a next node;

(c) determine feasibility of the link using a recent link state;

(d) if the link is feasible, include the next node in a selected route;

(e) if the link is not feasible, exclude the next node from the selected route;

(f) repeat steps (b)–(e) until one of a destination node is reached and a route cannot be computed to the destination node;

and wherein the processor is further adapted to:

(a) store a plurality of nodes, links and link costs in a second data structure;

(b) associate each node with a lowest cost estimate parameter;

(c) if the second data structure contains at least one node, execute the steps of:

(i) remove a minimum node from the second data structure;

(ii) if a sum of the lowest cost estimate parameter associated with the minimum node and a link cost from the minimum node to an adjacent node equals the lowest cost estimate parameter associated with the adjacent node, execute the step of assigning a pointer associated with the adjacent node to point to the minimum node;

(iii) if the sum of the lowest cost estimate parameter associated with the minimum node and the link cost from the minimum node to the adjacent node is less :than the lowest code estimate parameter associated with the adjacent node, execute the steps of:

(A) assigning the a pointer to the adjacent node to point to the minimum node;

(B) setting the lowest cost estimate parameter associated with the adjacent node to be equal to the sum of the lowest cost estimate parameter associated with the minimum node and the link cost from the minimum node to the adjacent node.

15. The network node according to claim 14, wherein the network protocol is IP ("Internet Protocol").

16. A network comprising:

at least one node;

a topology, wherein the topology defines a set of connections between the at least one node and wherein each of the one node further comprises:

an interface for receiving packet data;

a second interface for transmitting packet data:

a processor adapted to:

(a) store a directed graph of nodes, links and link costs using a first data structure;

(b) select a link from a current node to a next node;

(c) determine feasibility of the link using a recent link state;

(d) if the link is feasible, include the next node in a selected route;

(e) if the link is not feasible, exclude the next node from the selected route;

(f) repeat steps (b)–(e) until one of a destination node is reached and a route cannot be computed to the destination node;

and wherein the processor is further adapted to:

(a) store a plurality of nodes, links and link costs in a second data structure;

(b) associate each node with a lowest cost estimate parameter;

(c) if the second data structure contains at least one node, execute the steps of:

(i) remove a minimum node from the second data structure;

(ii) if a sum of the lowest cost estimate parameter associated with the minimum node and a link cost from the minimum node to an adjacent node equals the lowest cost estimate parameter associated with the adjacent node, execute the step of assigning a pointer associated with the adjacent node to point to the minimum node;

(iii) if the sum of the lowest cost estimate parameter associated with the minimum node and the link cost from the minimum node to the adjacent node is less than the lowest code estimate parameter associated with the adjacent node, execute the steps of:

(A) assigning the pointer to the adjacent node to point to the minimum node;

(B) setting the lowest cost estimate parameter associated with the adjacent node to be equal to the sum of the lowest cost estimate parameter associated with the minimum node and the link cost from the minimum node to the adjacent node.

* * * * *